United States Patent
Park et al.

(10) Patent No.: US 11,270,114 B2
(45) Date of Patent: Mar. 8, 2022

(54) AR DEVICE AND METHOD FOR CONTROLLING THE SAME

(71) Applicant: LG ELECTRONICS INC., Seoul (KR)

(72) Inventors: Daemyeong Park, Seoul (KR); Dongog Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 16/499,675

(22) PCT Filed: Aug. 30, 2019

(86) PCT No.: PCT/KR2019/011218
§ 371 (c)(1),
(2) Date: Sep. 30, 2019

(87) PCT Pub. No.: WO2021/040106
PCT Pub. Date: Mar. 4, 2021

(65) Prior Publication Data
US 2021/0209364 A1 Jul. 8, 2021

(51) Int. Cl.
*G06T 7/73* (2017.01)
*G06K 9/00* (2022.01)
(Continued)

(52) U.S. Cl.
CPC ..... *G06K 9/00671* (2013.01); *G02B 27/0176* (2013.01); *G06F 3/013* (2013.01);
(Continued)

(58) Field of Classification Search
CPC ..... G06K 9/00671; G06T 7/73; G06T 19/006; G06T 2207/30204; G02B 27/0176;
(Continued)

(56) References Cited

U.S. PATENT DOCUMENTS 8,228,315 B1 * 7/2012 Starner ................. G06F 3/0304
345/175
2013/0002717 A1 1/2013 Deffeyes et al.
(Continued)

FOREIGN PATENT DOCUMENTS

KR 10-2009-0087807 A 8/2009
KR 10-2012-0005879 A 1/2012
(Continued)

*Primary Examiner* — Jitesh Patel
(74) *Attorney, Agent, or Firm* — Birch, Stewart, Kolasch & Birch, LLP

(57) ABSTRACT

Disclosed is an AR device and method for controlling the same. According to the present disclosure, an augmented reality (AR) device comprises a frame supported by a user's head, a processor providing an AR image, a display connected with the frame and overlaying and displaying the AR image received from the processor on a real world, a marker generator generating a marker corresponding to an AR object, and a marker display displaying the marker generated by the marker generator. The AR device of the present disclosure may be associated with an artificial intelligence module, a robot, a virtual reality (VR) device, a device related to a 5G service, and the like.

19 Claims, 33 Drawing Sheets

(51) Int. Cl.
  *G02B 27/01* (2006.01)
  *G06F 3/01* (2006.01)
  *G06F 3/04815* (2022.01)
  *G06T 19/00* (2011.01)

(52) U.S. Cl.
  CPC ............ *G06F 3/04815* (2013.01); *G06T 7/73* (2017.01); *G06T 19/006* (2013.01); *G02B 2027/014* (2013.01); *G02B 2027/0138* (2013.01); *G06T 2207/30204* (2013.01)

(58) Field of Classification Search
  CPC ...... G02B 2027/0138; G02B 2027/014; G06F 3/013; G06F 3/04815
  See application file for complete search history.

(56) References Cited

U.S. PATENT DOCUMENTS

| | | | | |
|---|---|---|---|---|
| 2016/0277725 A1* | 9/2016 | Ellsworth | ............ | G02B 27/017 |
| 2016/0321842 A1* | 11/2016 | Goto | ........................ | G06T 7/11 |
| 2019/0146653 A1* | 5/2019 | Ikuta | ...................... | G09G 3/002 |
| | | | | 715/863 |
| 2019/0258058 A1* | 8/2019 | Fortin-Desch nes | ... | G06F 3/011 |

FOREIGN PATENT DOCUMENTS

| KR | 10-2012-0086794 A | 8/2012 |
|---|---|---|
| KR | 10-2015-0026375 A | 3/2015 |
| KR | 10-2019-0095334 A | 8/2019 |

* cited by examiner

[Figure 1]
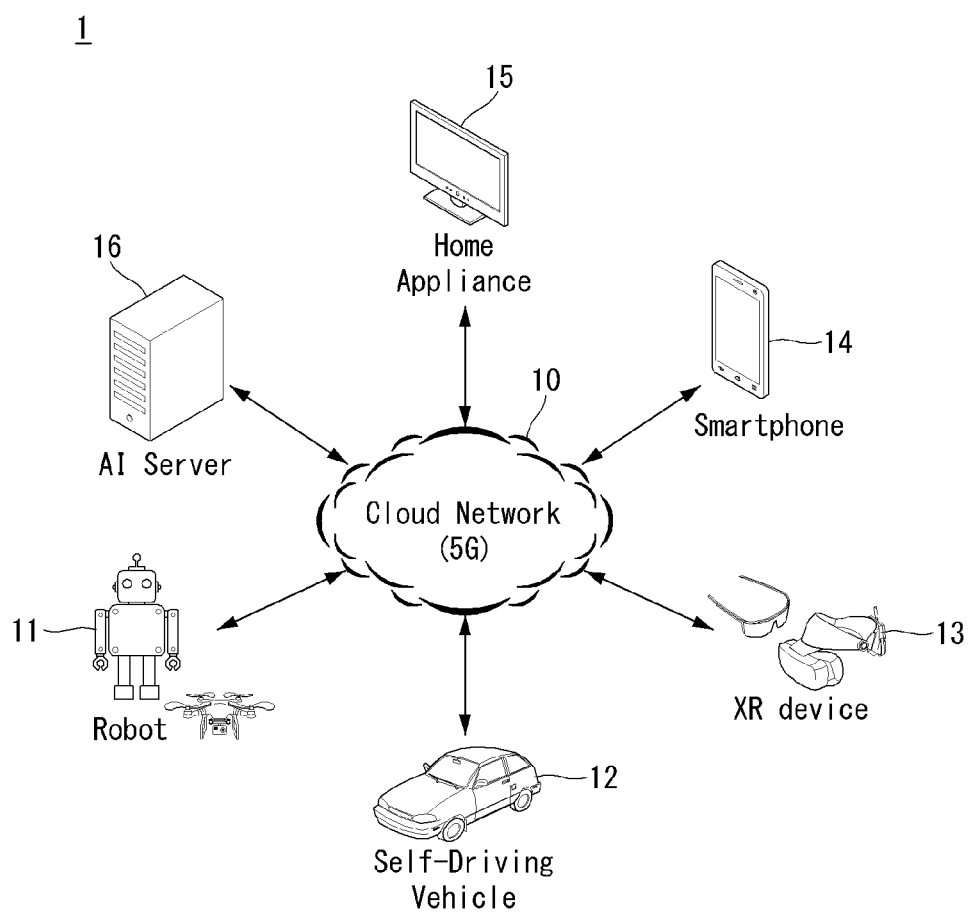

[Figure 2]
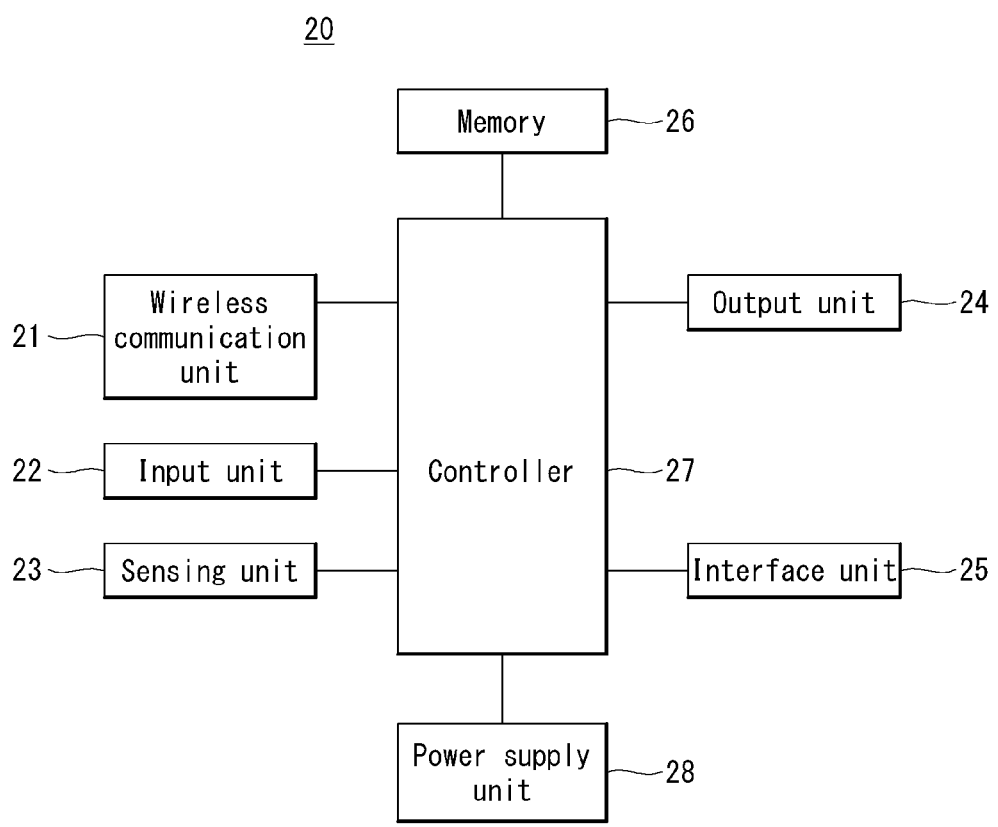

【Figure 3】
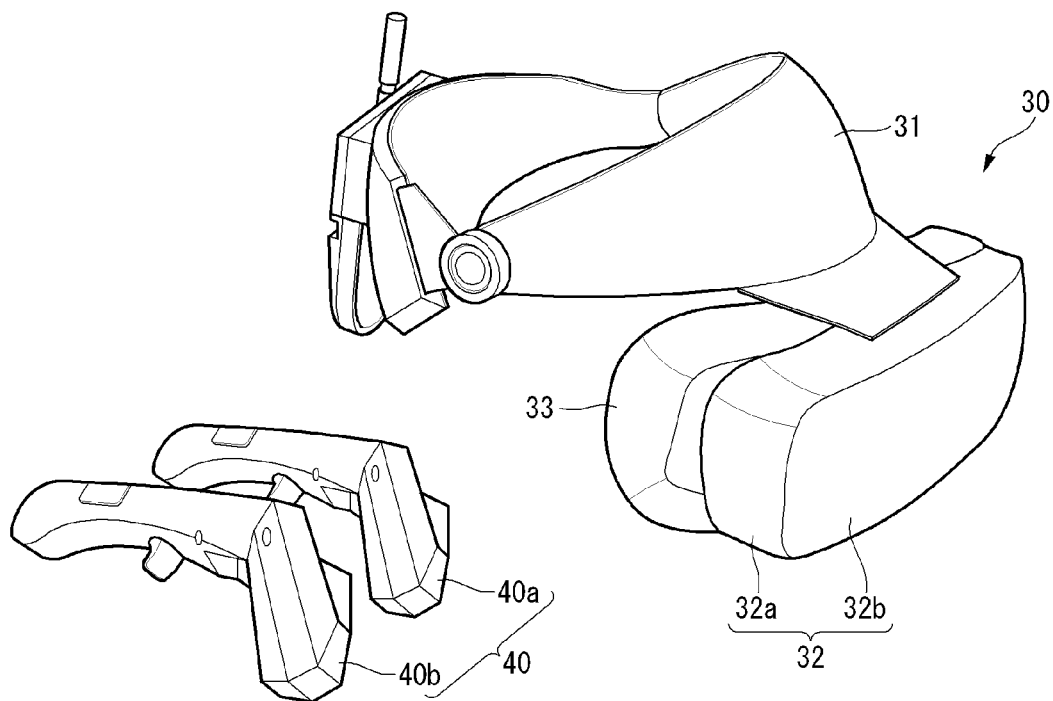

【Figure 4】
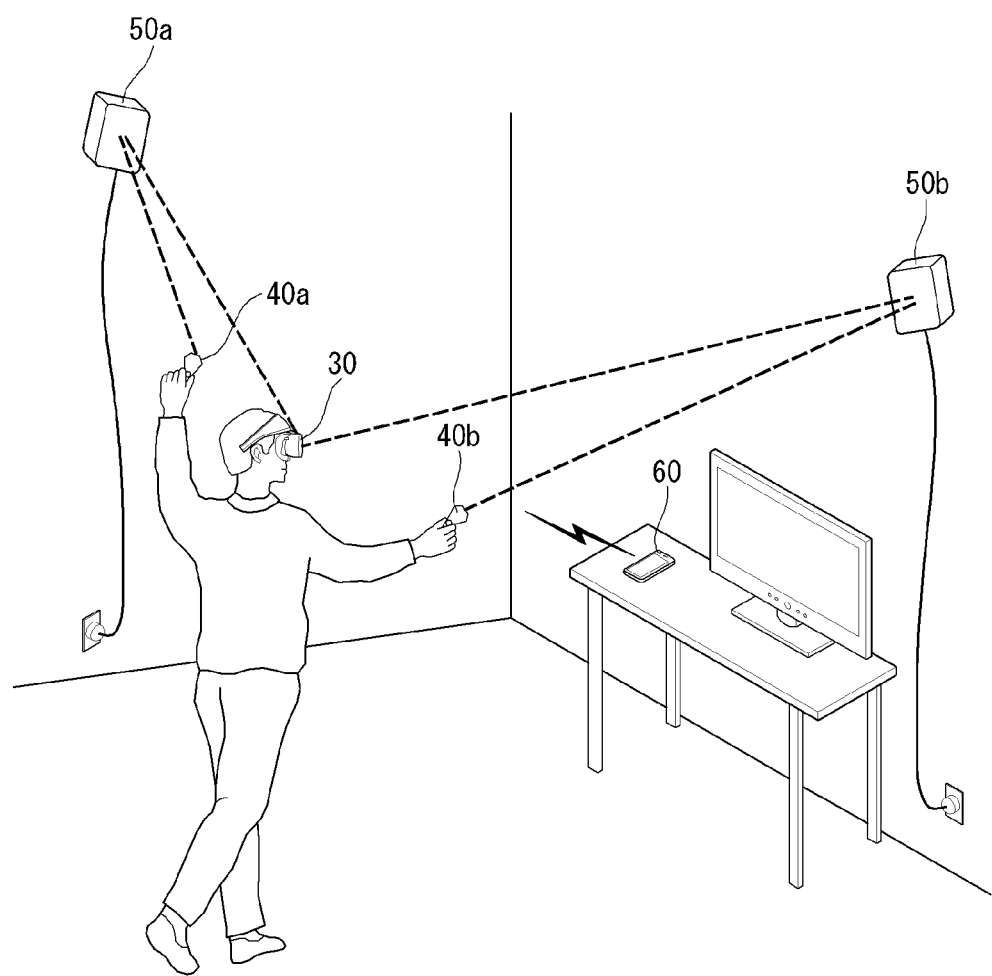

[Figure 5]
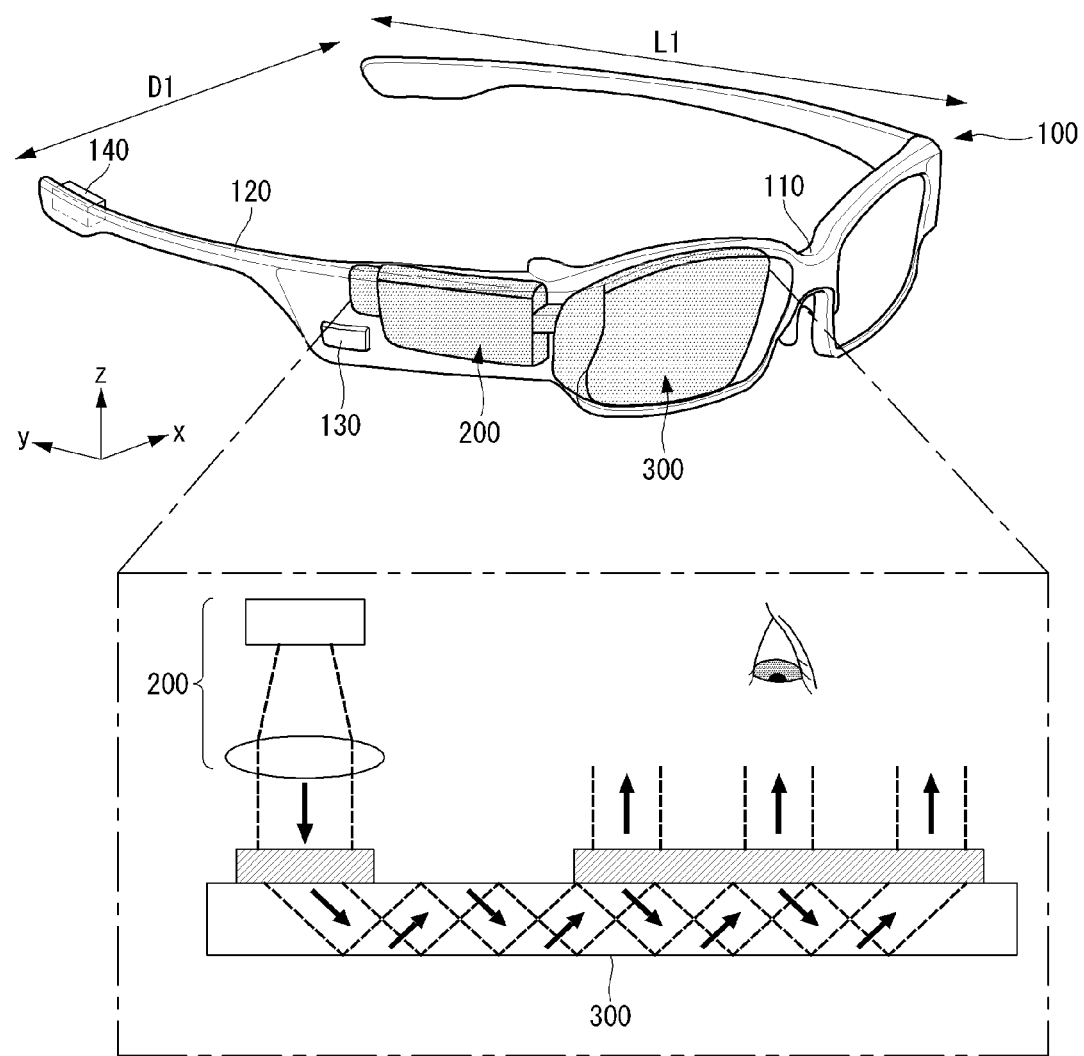

[Figure 6]
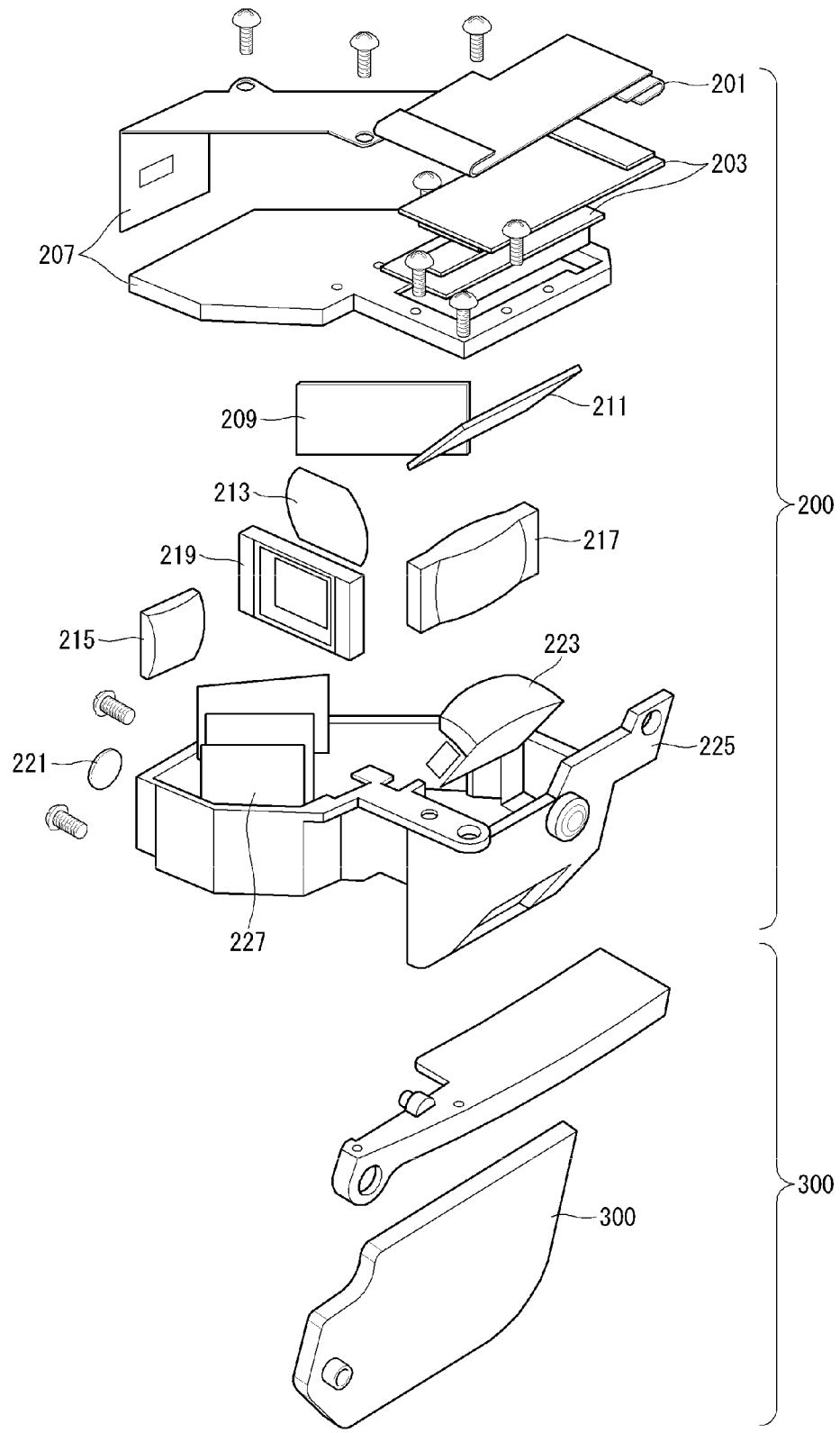

[Figure 7]
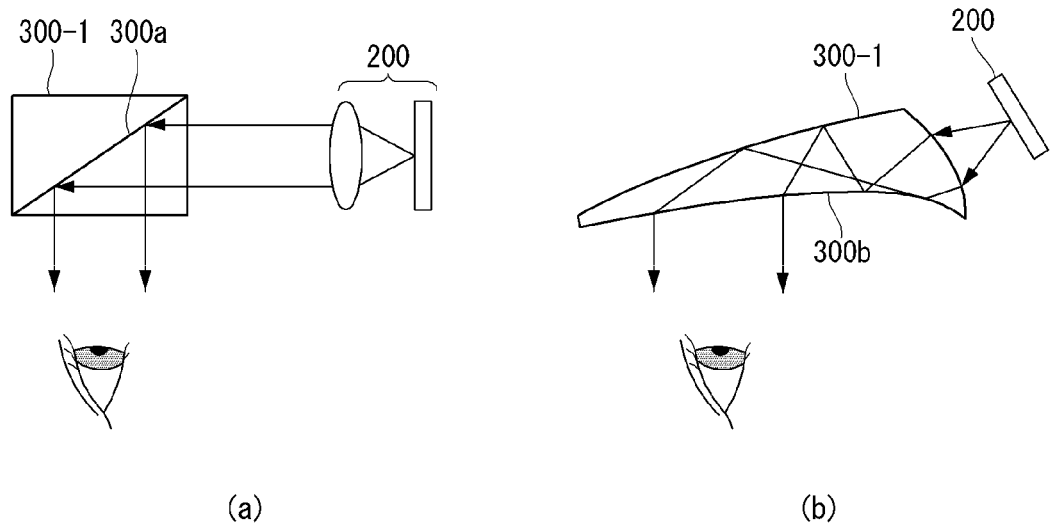
(a)  (b)

[Figure 8]
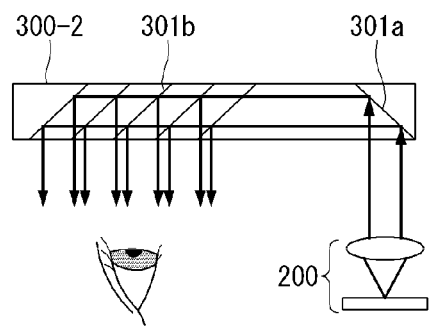
(a)
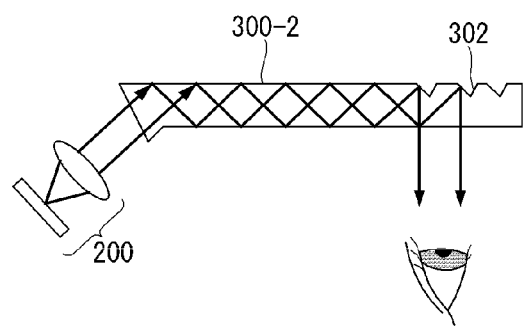
(b)
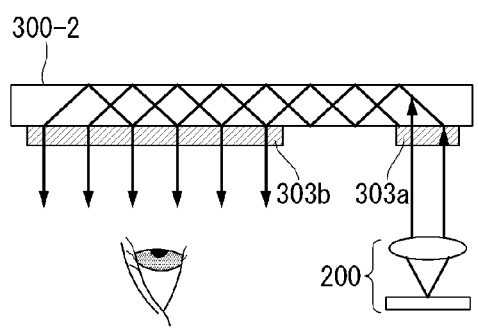
(c)
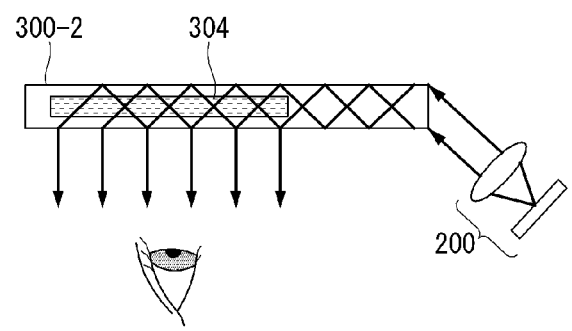
(d)
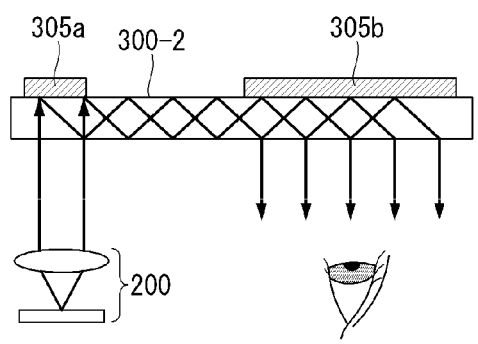
(e)
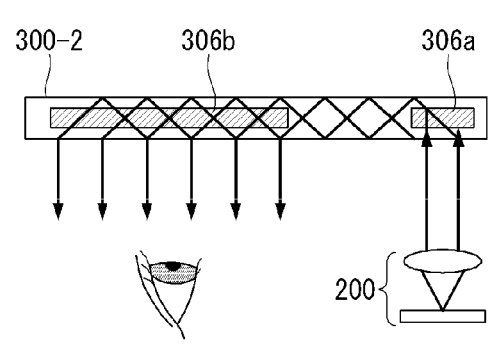
(f)

[Figure 9]
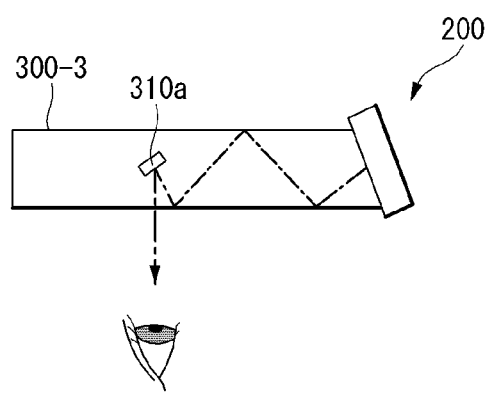
(a)
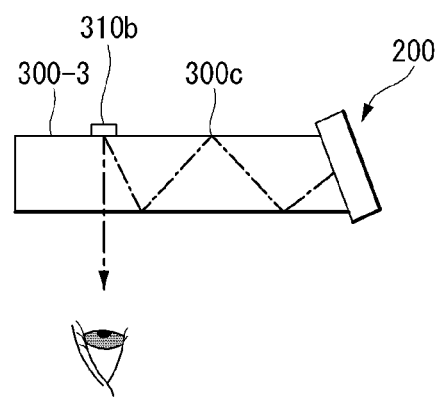
(b)
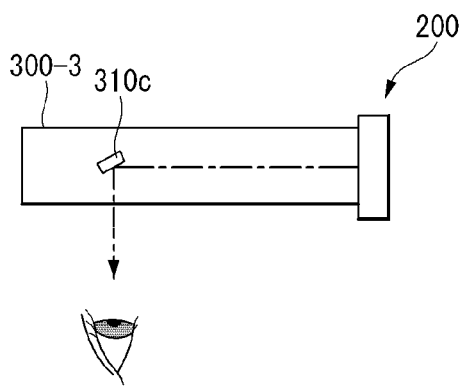
(c)
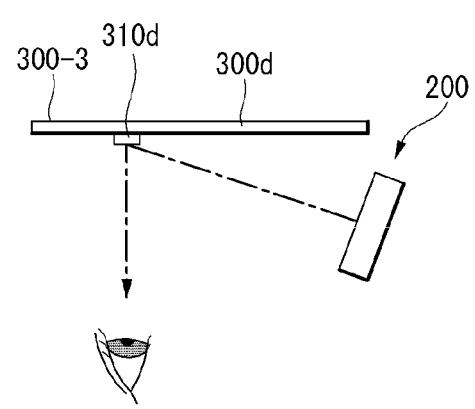
(d)

【Figure 10】
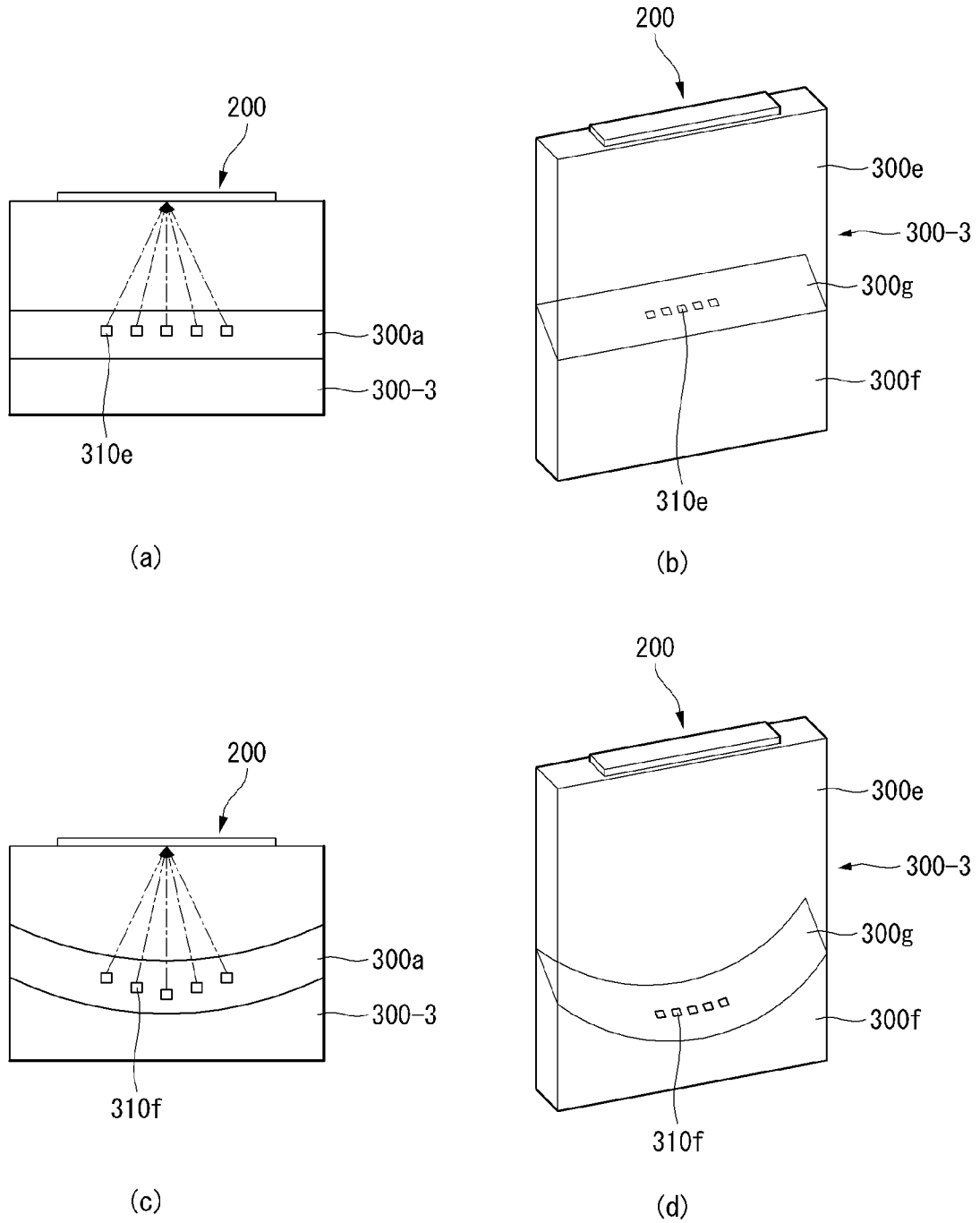

[Figure 11]
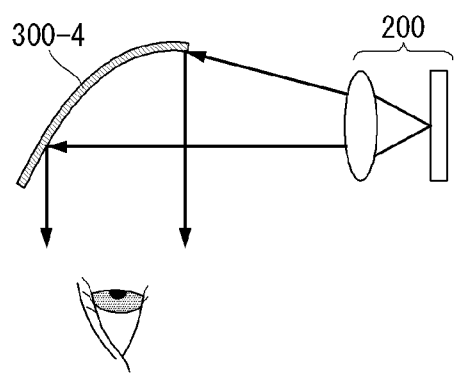
(a)
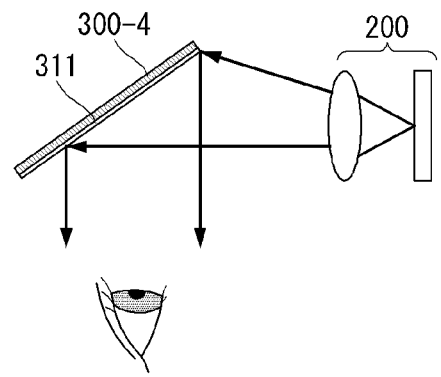
(b)
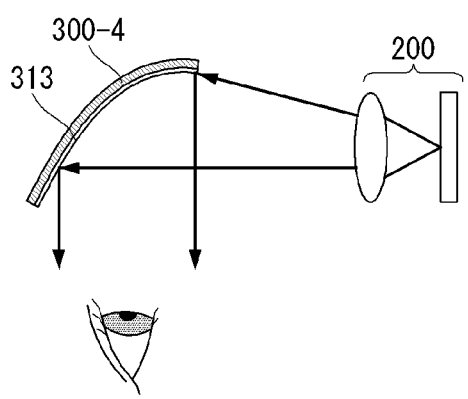
(c)

[Figure 12]
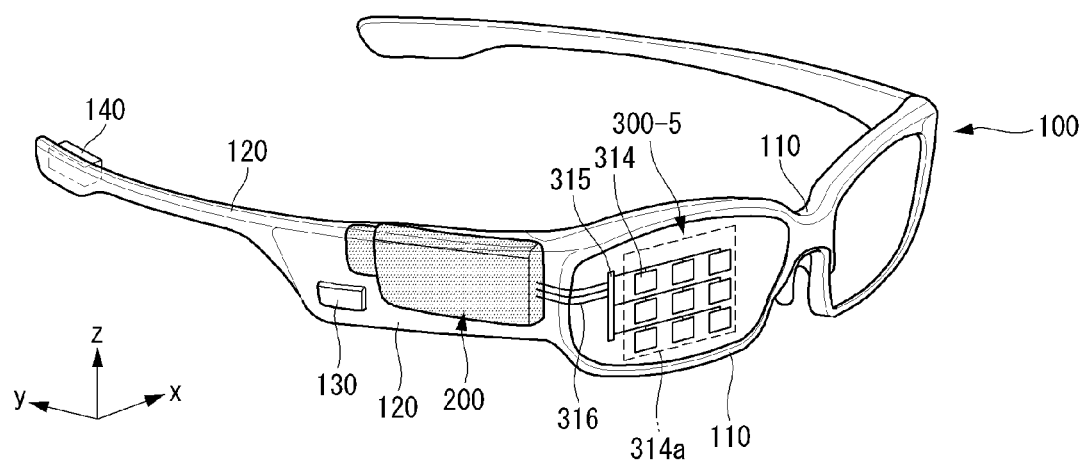

[Figure 13]
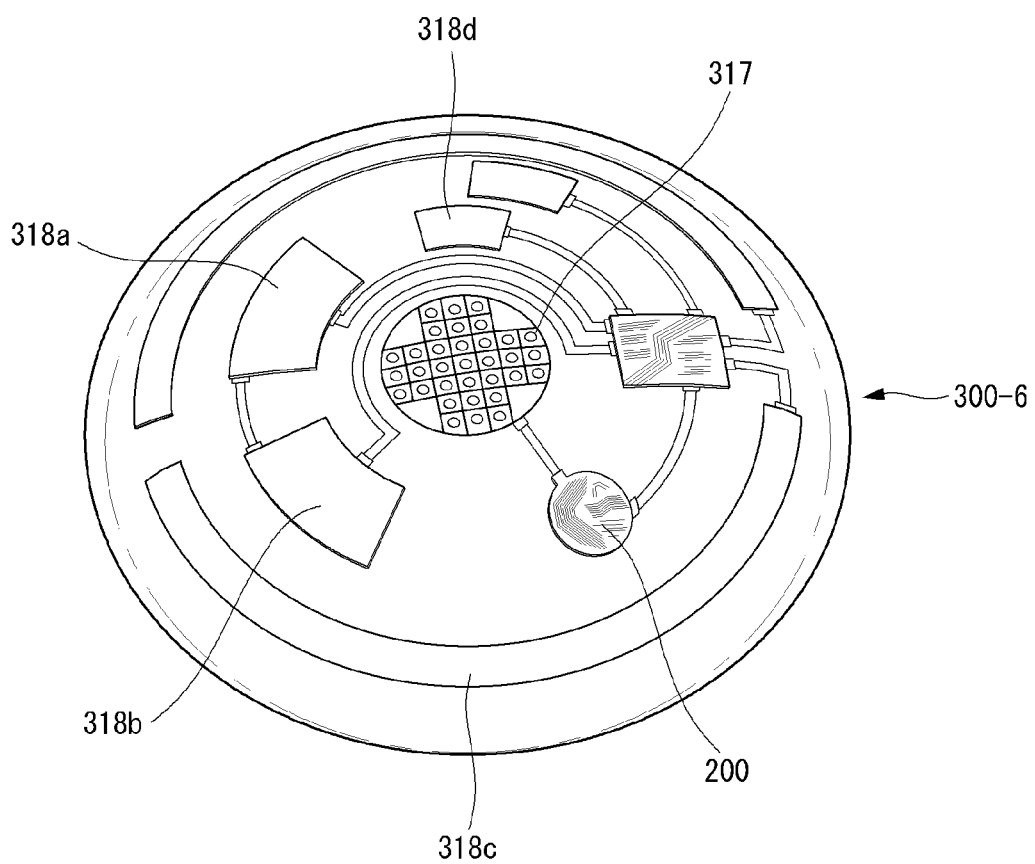

【Figure 14】
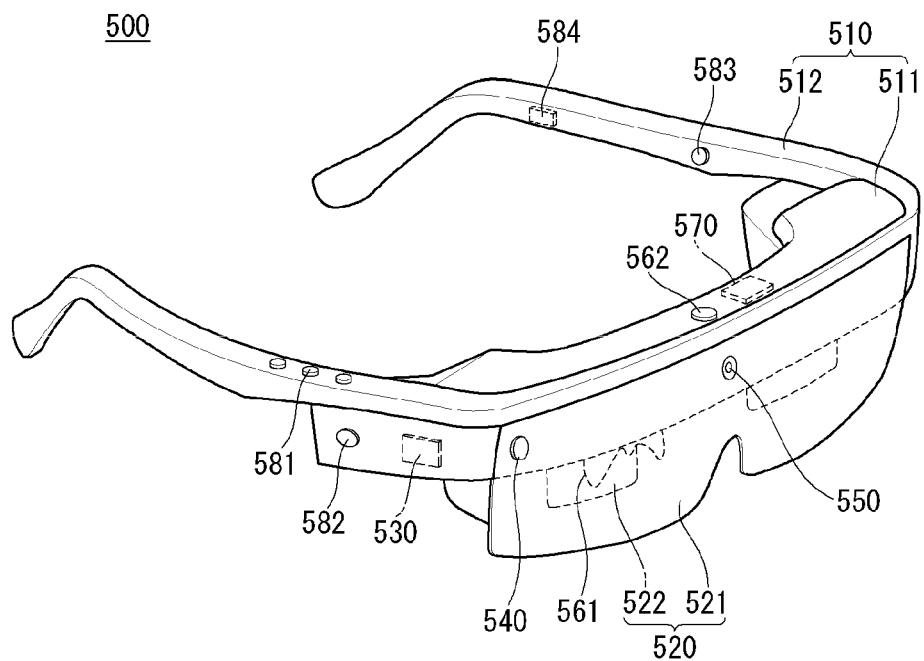

[Figure 15]
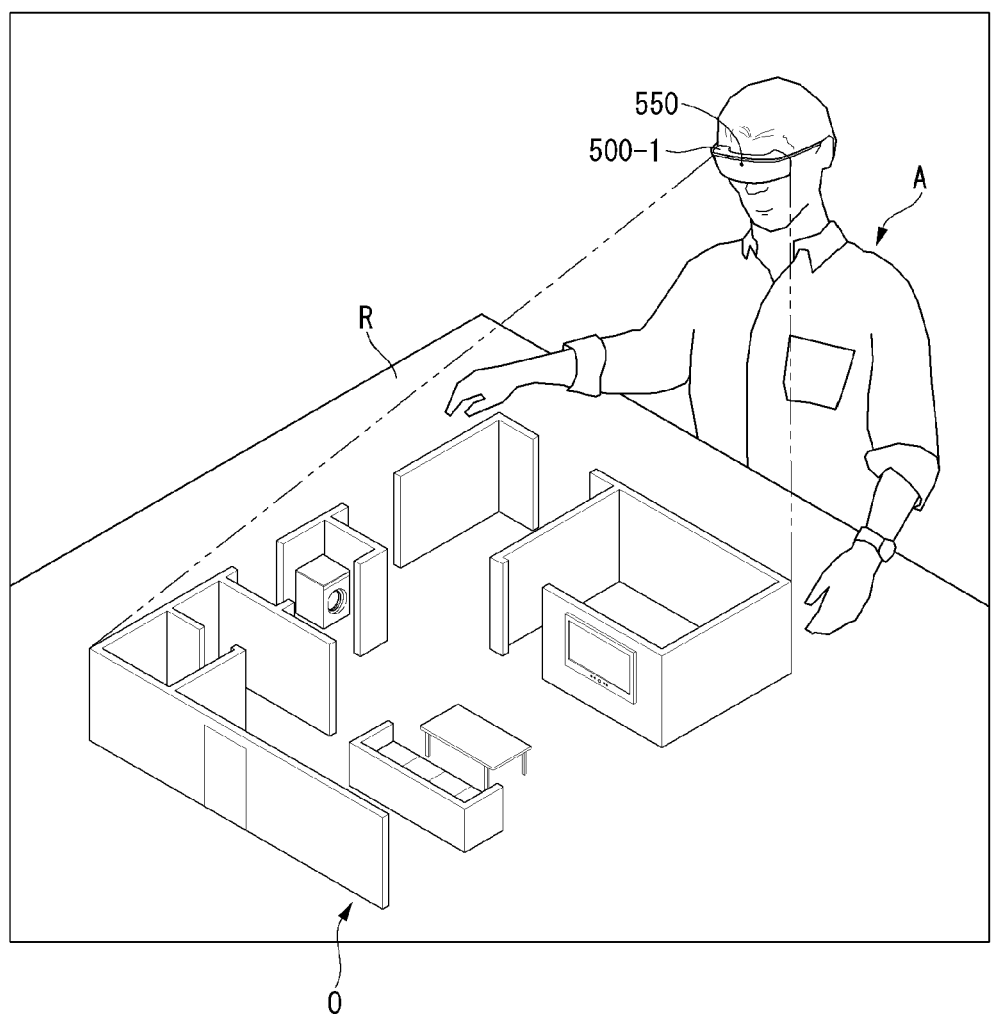

[Figure 16]
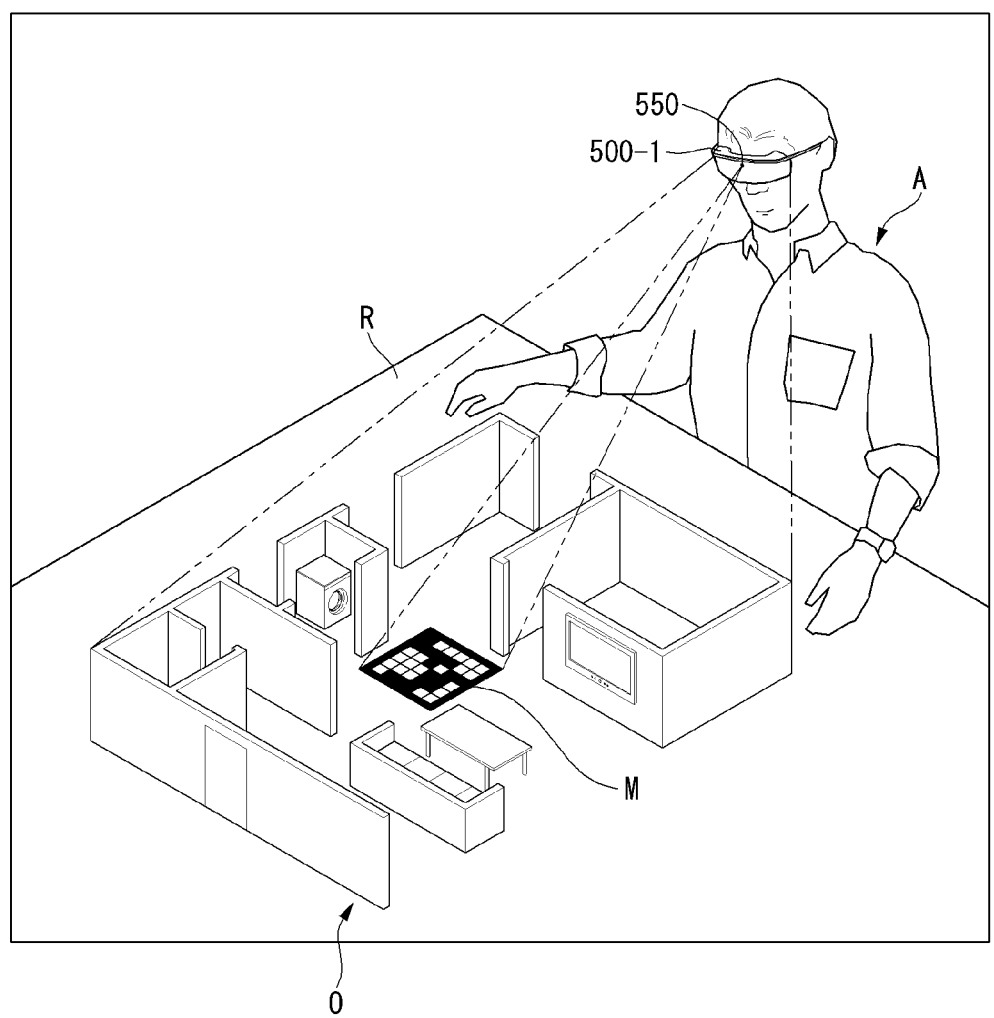

[Figure 17]
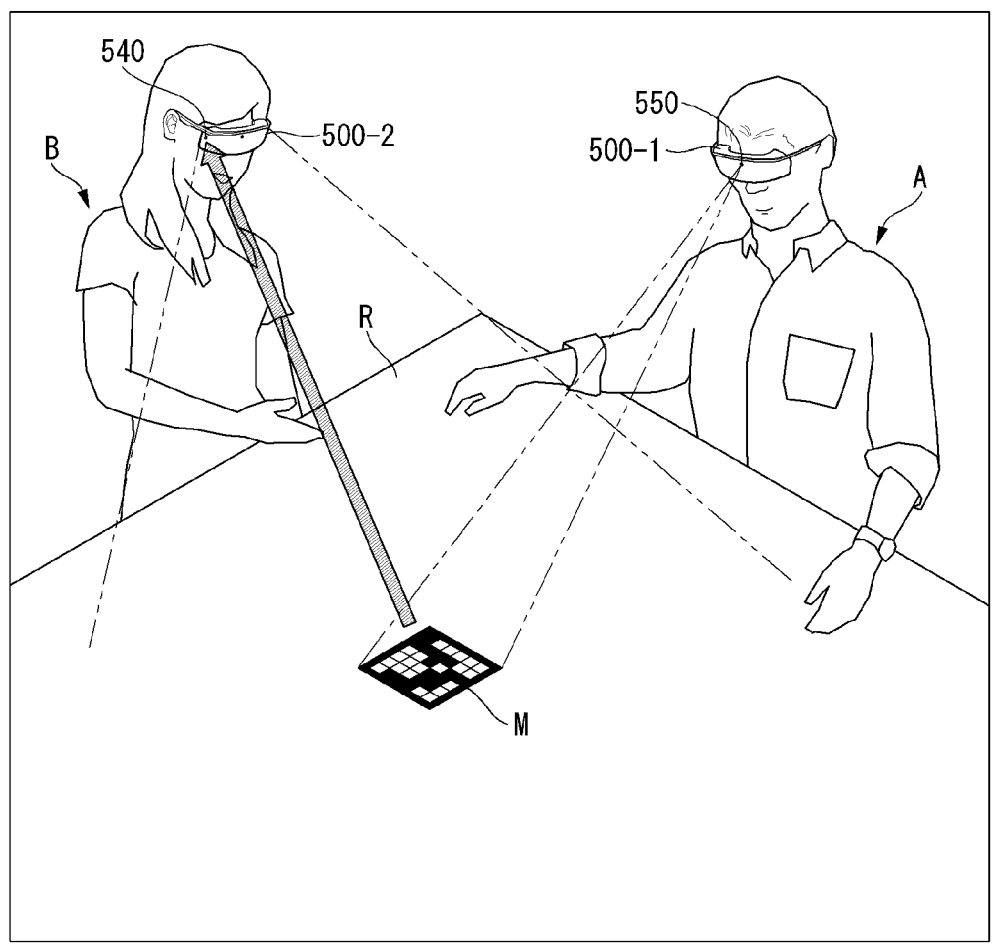

[Figure 18]
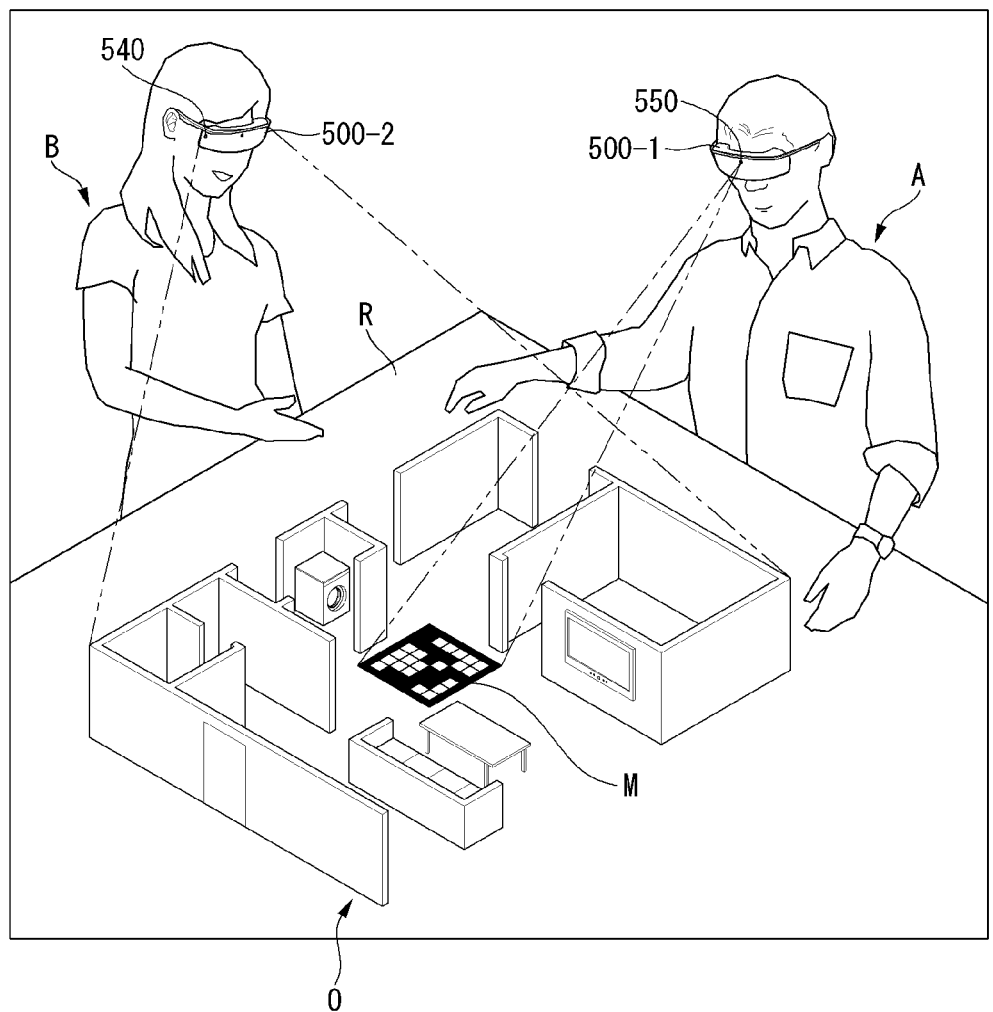

[Figure 19]
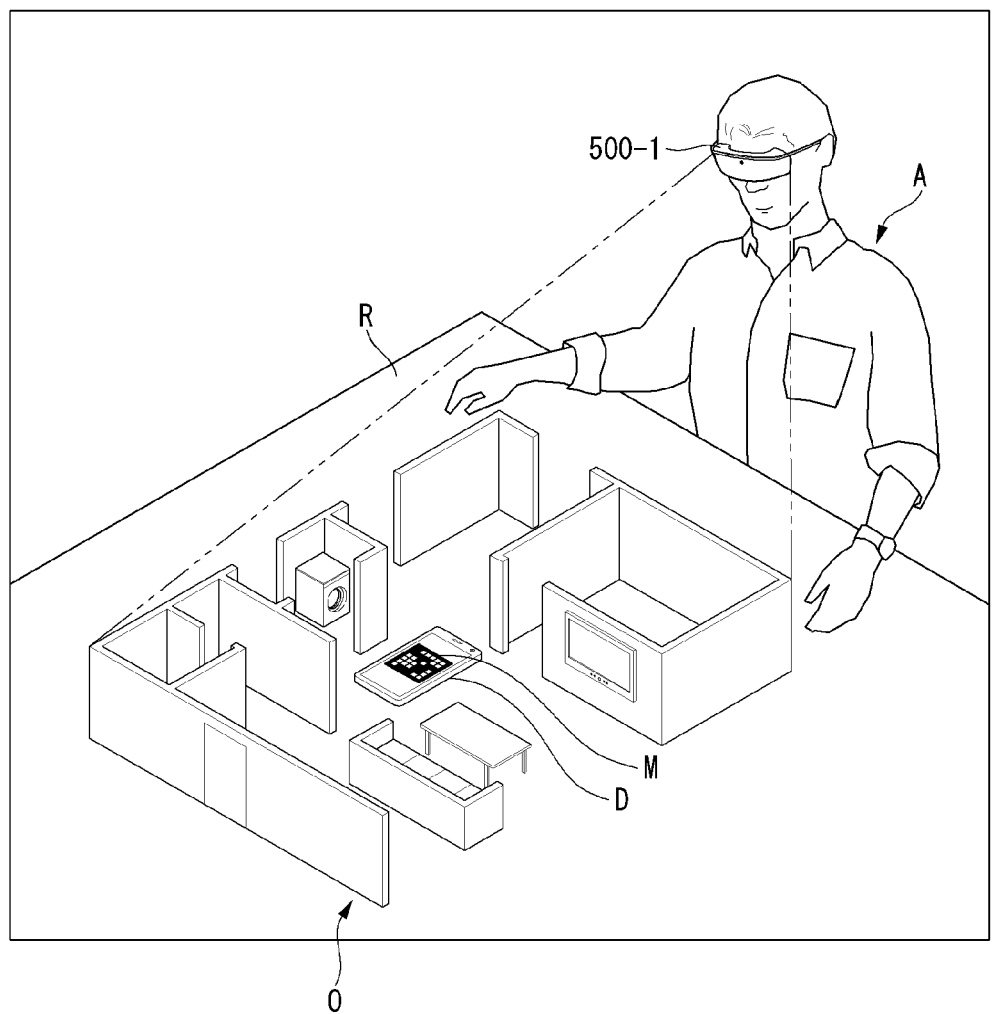

[Figure 20]
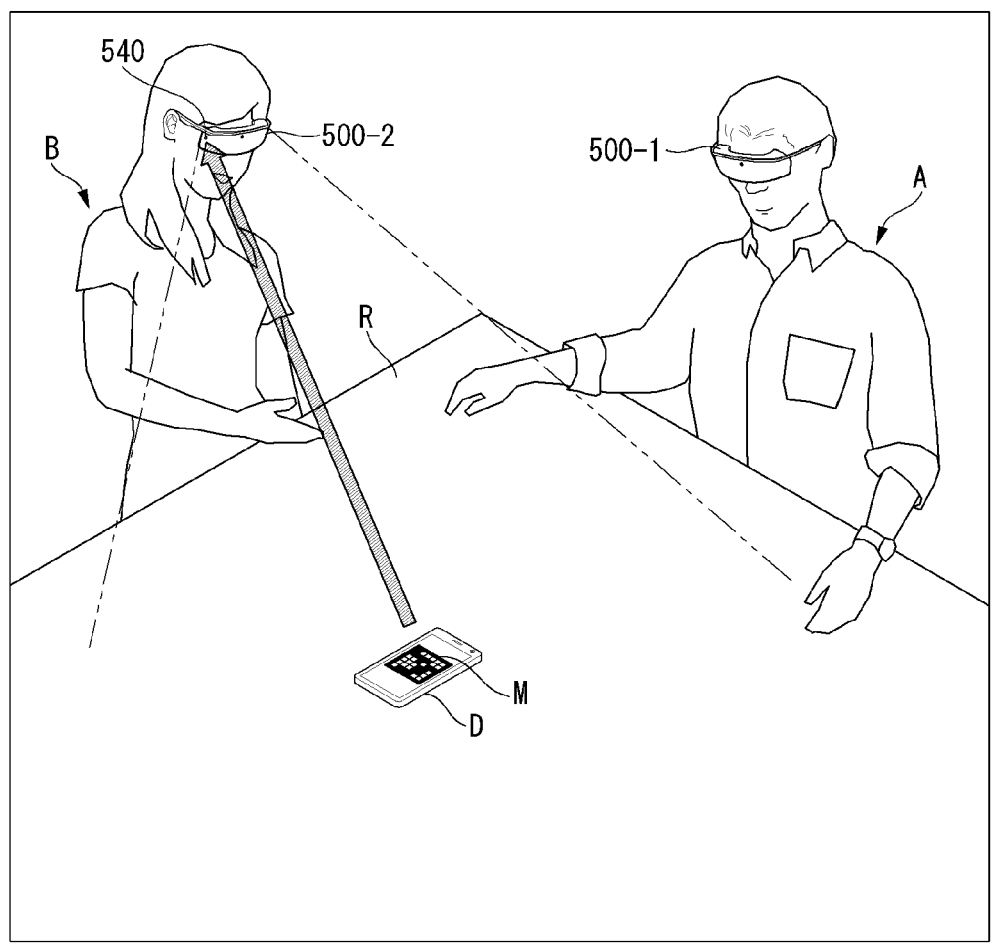

[Figure 21]
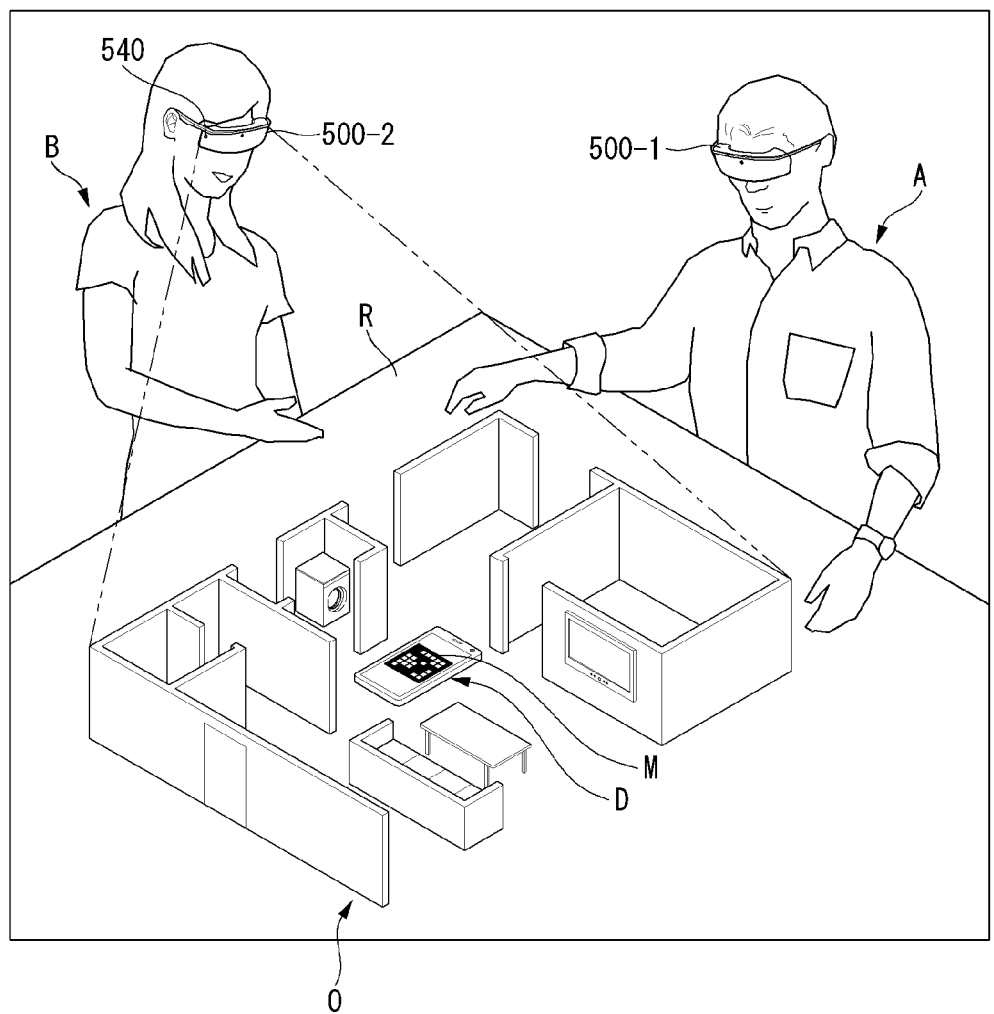

[Figure 22]
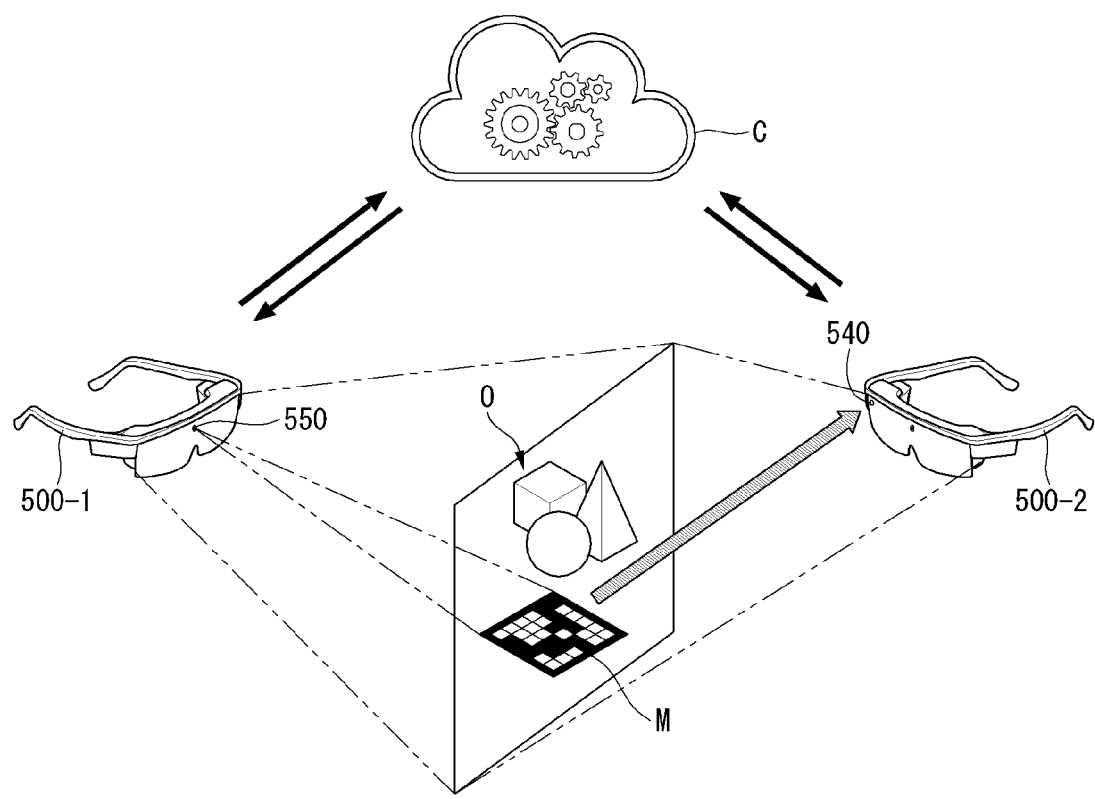

【Figure 23】
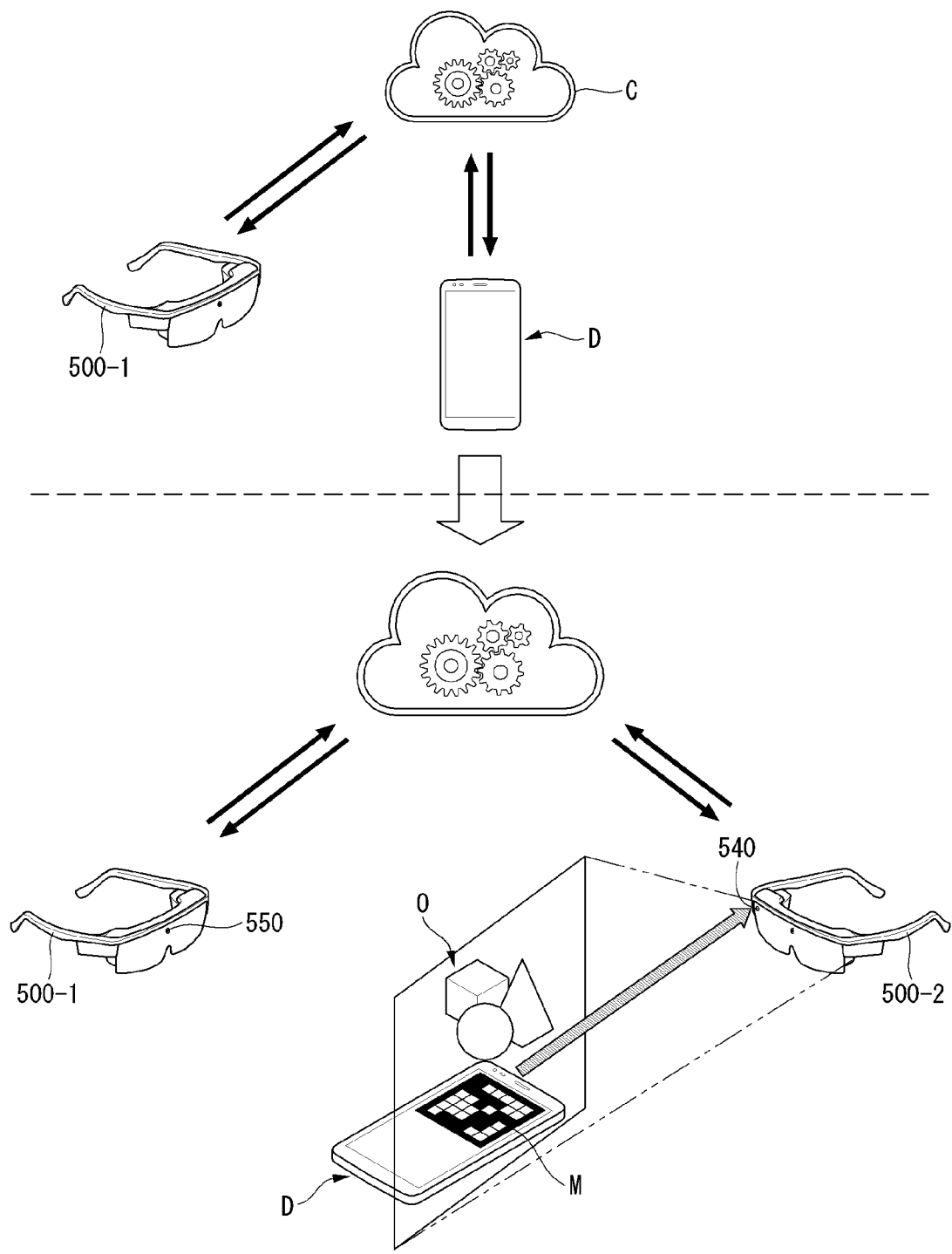

[Figure 24]
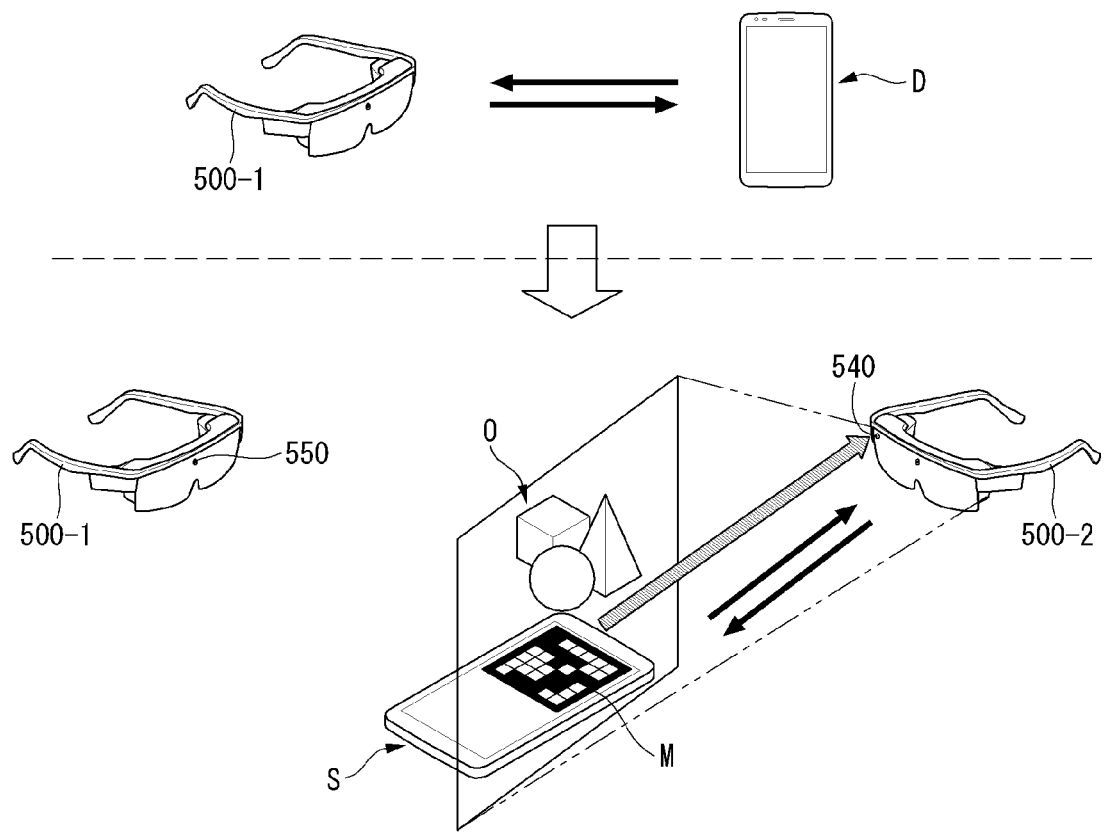

[Figure 25]
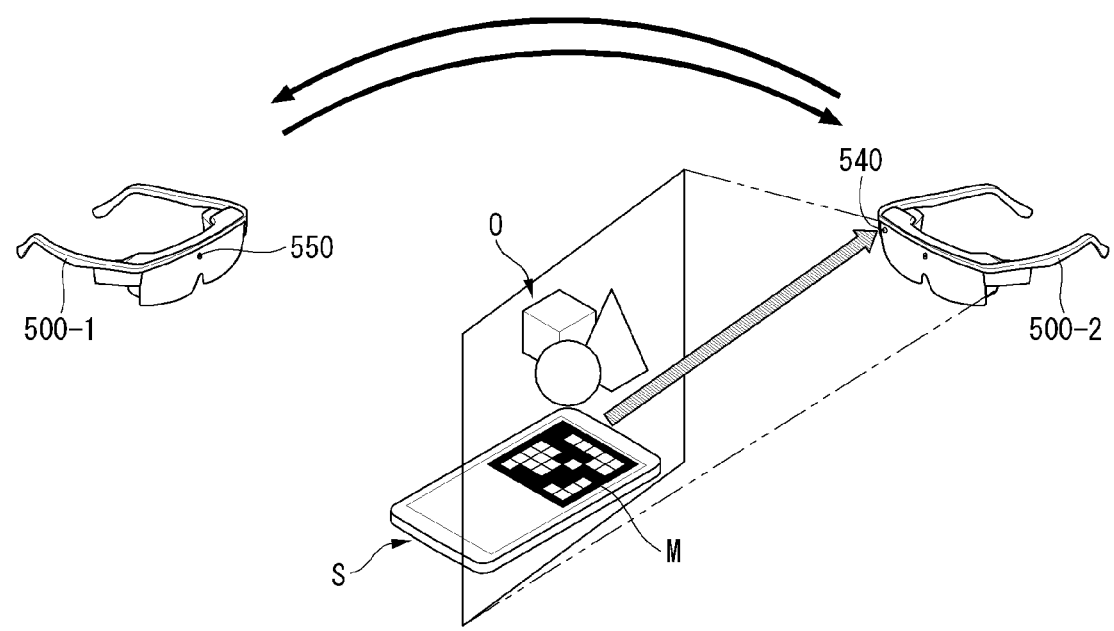

【Figure 26】
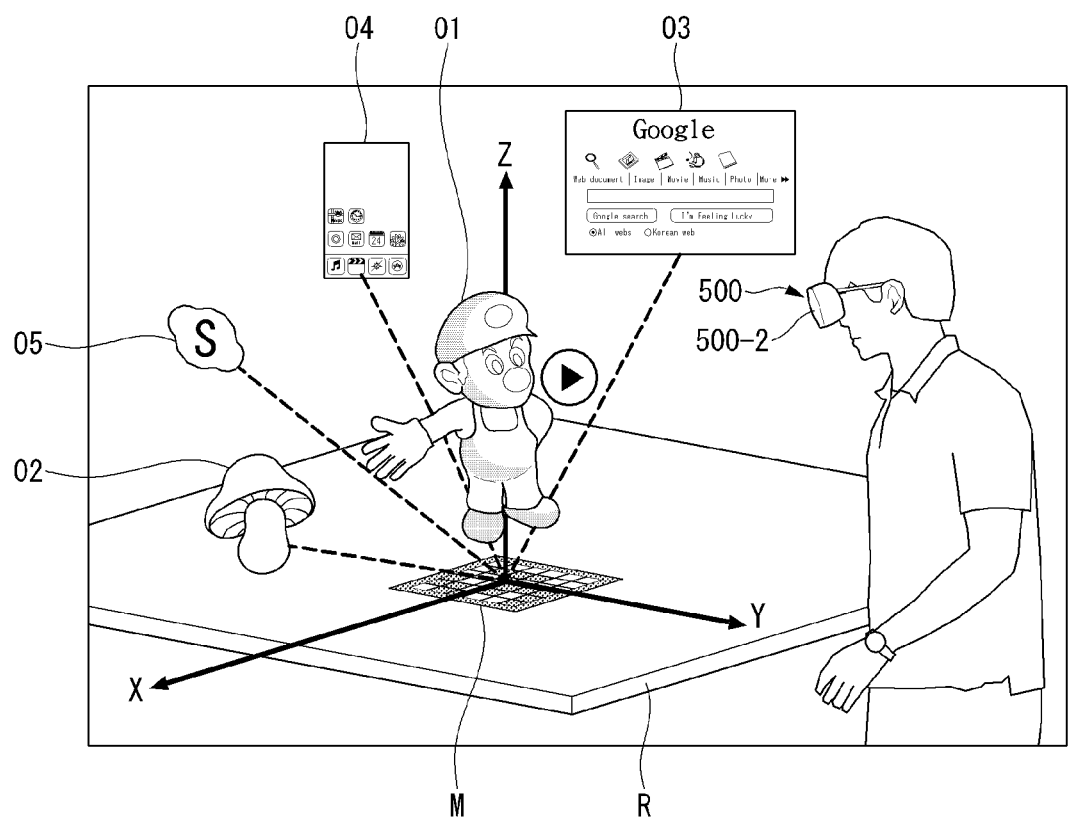

【Figure 27】
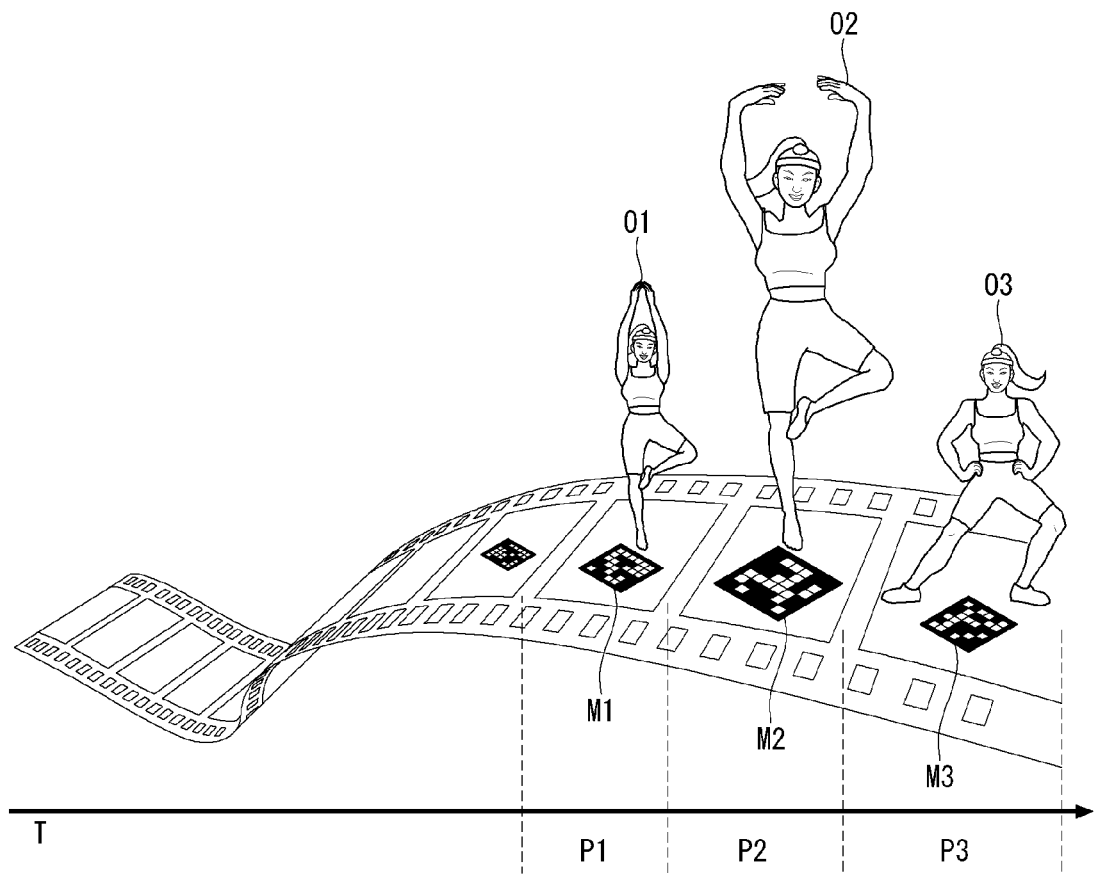

【Figure 28】
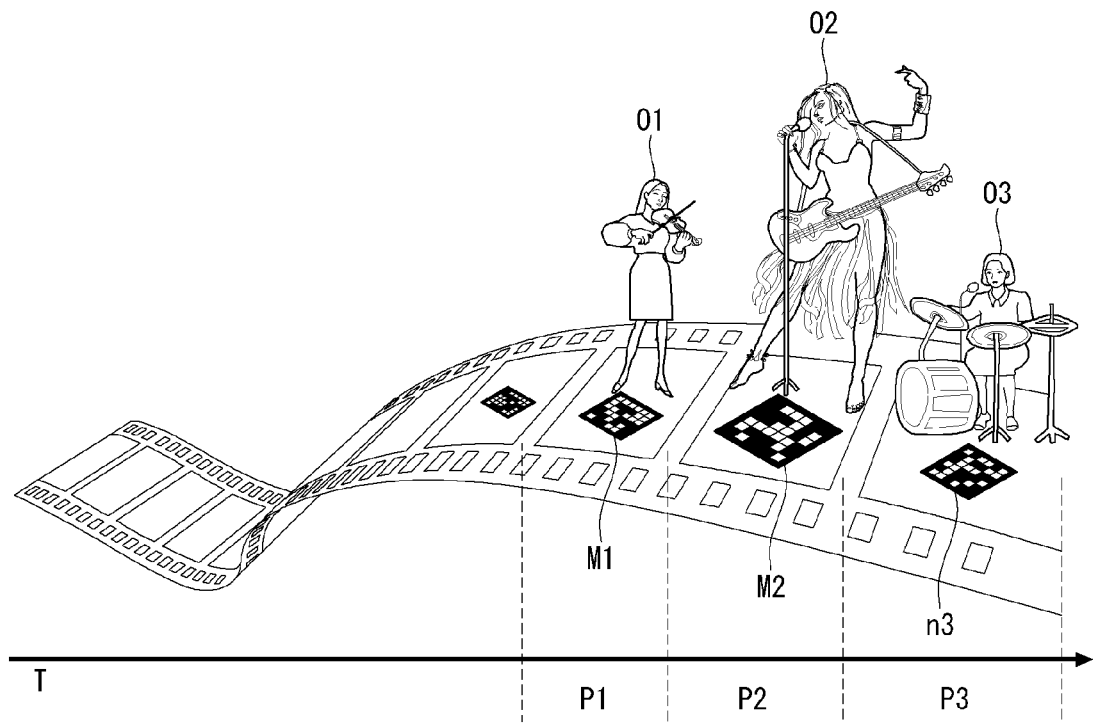

[Figure 29]
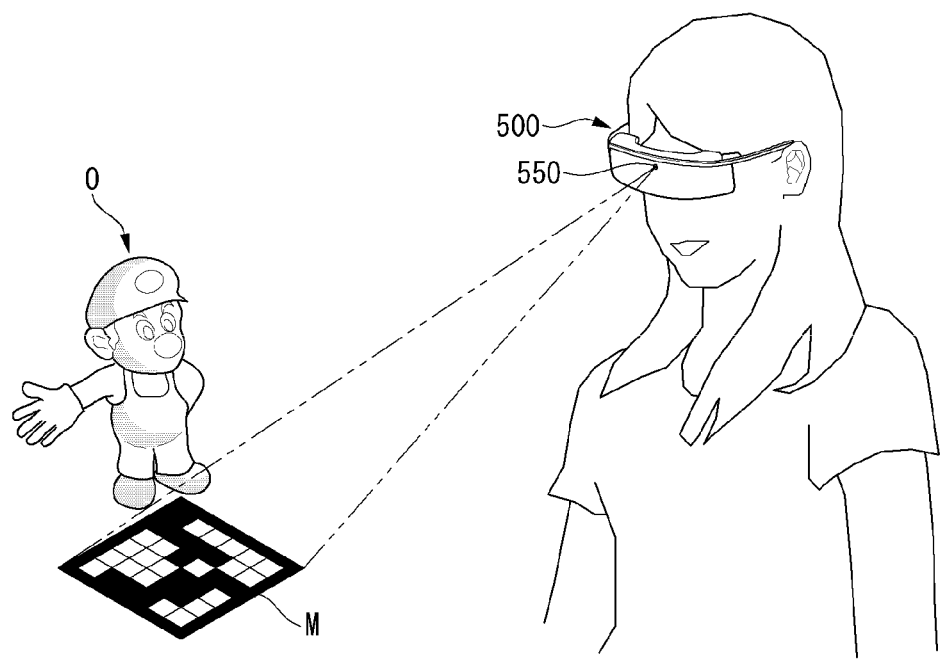

【Figure 30】
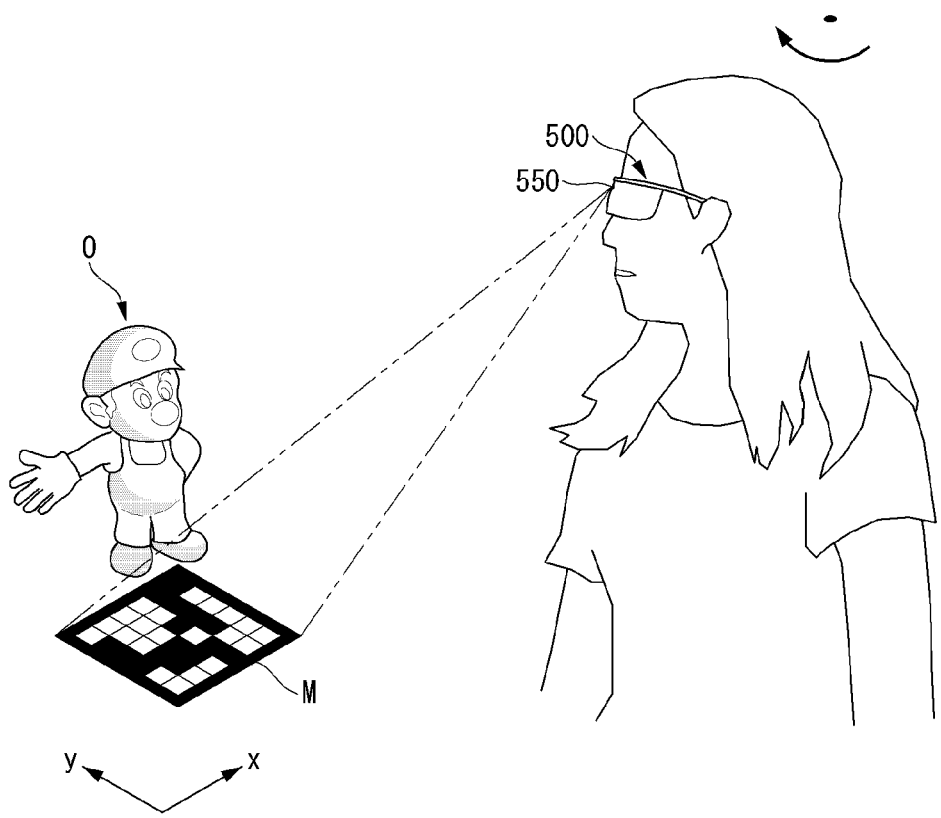

【Figure 31】
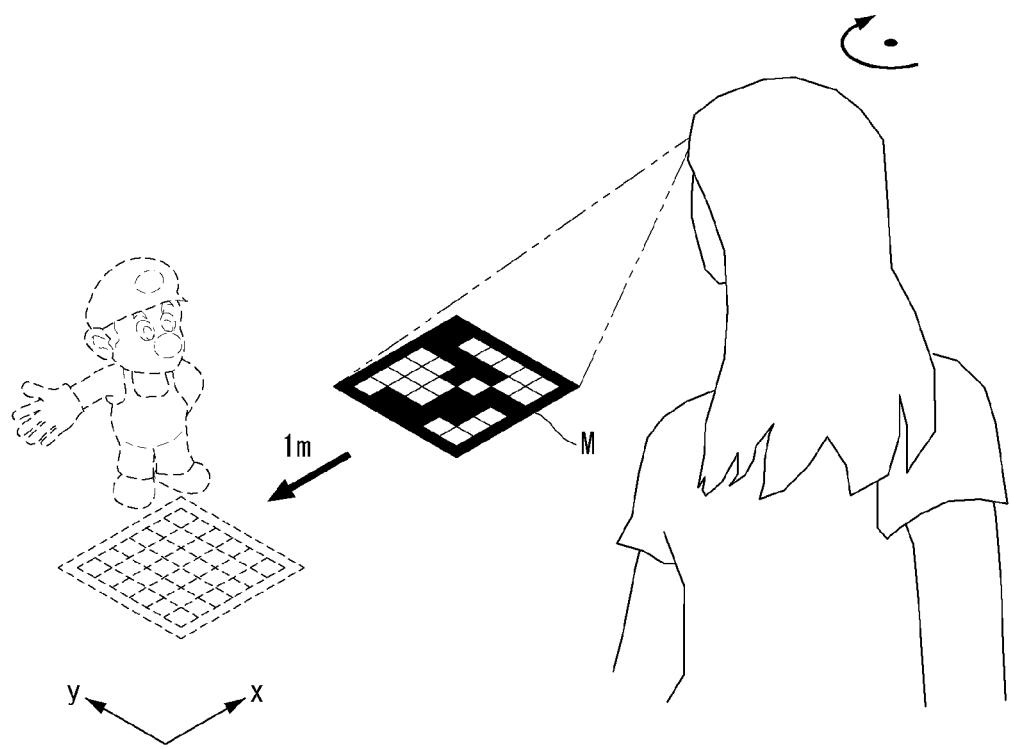

【Figure 32】
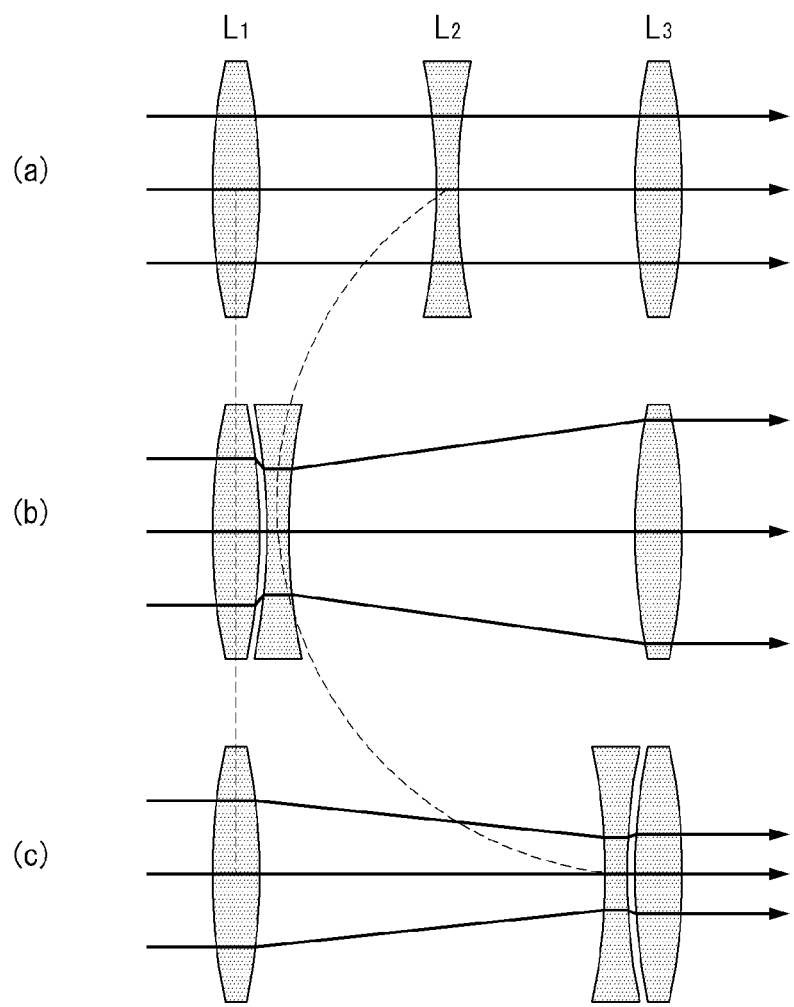

[Figure 33]
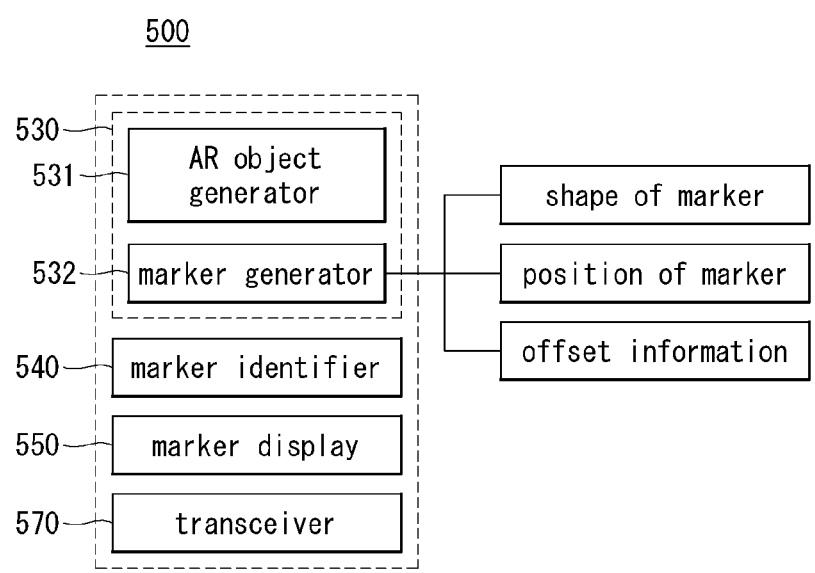

AR DEVICE AND METHOD FOR CONTROLLING THE SAME

CROSS REFERENCE TO RELATED APPLICATIONS

This application is the National Phase of PCT International Application No. PCT/KR2019/011218, filed on Aug. 30, 2019, which is hereby expressly incorporated by reference into the present application.

TECHNICAL FIELD

Embodiments of the present disclosure relate to an AR device and a method for controlling the AR device. More specifically, embodiments of the present disclosure relate to an electronic device used in, e.g., virtual reality (VR), augmented reality (AR), or mixed reality (MR) and an AR sharing system.

BACKGROUND ART

Virtual reality (VR) means a particular environment or context that is artificially created using, e.g., a computer and is similar but not real or a technology therefor.

Augmented reality (AR) is technology that allows a virtual object to look present in the original environment by synthesizing the virtual object or information with the actual environment.

Mixed reality (MR) or hybrid reality (HR) refers to creating a new environment or new information by merging the virtual world and the real world. Among others, enabling real-time interactions between things present in the virtual and real world is called mixed reality.

A created virtual environment or circumstance stimulates the user's five senses and allows her to have a similar spatial and temporal experience to the reality while freely passing the border between the real and virtual worlds. Not simply is the user immersed in such an environment, but the user may also interact with things implemented in the environment by controlling or instructing them on a device.

Recently underway are vigorous research efforts to develop gear used in the technology. Among others, research for sharing AR information among several users is steadily in progress.

However, conventional AR information sharing systems, which are implemented in a peer-to-peer (P2P) manner, are accompanied by several problems.

To allow the information provided by the AR provider device to be shared with the receiving device, the AR provider device needs to transmit map data and anchor data for the AR corresponding to the real world, as well as the object data so that the same object can be viewed in the same position as the real world. Further, the map data information needs to be sent again whenever the map data is updated.

Sharing such massive data takes too long and, if two users simultaneously use the AR data, connection may be rendered unstable. Such issues may worsen as more sharing devices involve.

Moreover, the conventional P2P scheme is limited in that the provider device and the receiving device are required to use the same software for transmission. For example, the sharing devices all need to use Google ARCore or Apple ARKit.

Further, the use of the conventional P2P scheme requires a complicated process for hooking up the sharing devices.

DISCLOSURE

Technical Problem

An object of the present disclosure is to provide an electronic device capable of sharing the same AR object in the same position even without map data corresponding to the real world to share AR objects with others when using the electronic device used for, e.g., virtual reality (VR), augmented reality (AR), or mixed reality (MR), and an AR sharing system having the electronic device.

Another object of the present disclosure is to provide an electronic device capable of shortening the sharing time by minimizing shared data in sharing AR objects with others and an AR sharing system having the electronic device.

Still another object of the present disclosure is to provide an electronic device that allows for an easier sharing of AR objects even when two electronic devices use AR programs with different map information to share AR objects with others and an AR sharing system having the electronic device.

Technical Solution

According to an embodiment of the present disclosure, an augmented reality (AR) device comprises a frame supported by a user's head, a processor providing an AR image, a display connected with the frame and overlaying and displaying the AR image received from the processor on a real world, a marker generator generating a marker corresponding to an AR object, and a marker display displaying the marker generated by the marker generator.

The marker display may project a marker image to the real world.

The frame may include a front frame and a pair of side frames connected with two opposite sides of the front frame and extending backwards from the two opposite sides of the front frame. The display may include a left eye display disposed on one side of the front frame and a right eye display disposed on an opposite side of the front frame. The marker display may be provided between the left eye display and the right eye display.

The marker display may be provided as a separate device from the frame, and the marker display may be wiredly or wirelessly connected with the marker generator to display the generated marker.

The AR device may further comprise a transceiver transferring identification information for the generated marker and AR object information corresponding to the generated marker to a host.

The AR device may further comprise a camera capturing the real world and a marker identifier identifying a marker in an image captured by the camera. The processor may provide AR object information corresponding to the identified marker to the display.

The AR device may further comprise a transceiver transferring identification information for the generated marker and AR object information corresponding to the generated marker to a host. The transceiver may transfer identification information for the identified marker to the host and obtains AR object information corresponding to the identification information for the identified marker. The processor may provide AR object information corresponding to the identified marker to the display.

The marker display may be provided to rotate in one or more axial directions.

The AR device may further comprise a motion sensor detecting a motion of the display. The processor may rotate the marker display according to information provided from the motion sensor to allow the marker displayed by the marker display to be projected in the same position as the position in the real world.

The AR device may further comprise a depth sensor detecting a depth of a real world object to which the marker is projected. The marker generator may change the depth of the marker according to information provided from the depth sensor.

The AR device may further comprise a color sensor detecting a color of a real world object to which the marker is projected. The marker generator may change a color of the marker according to information provided from the color sensor.

The AR device may further comprise an eye sensor detecting the user's pupil. The processor may determine position and/or depth information for a real-world object where the user is to display the marker based on information provided from the eye sensor and transfer an instruction to the marker display to enable the marker to be displayed on the real-world object where the user is to display the marker.

The marker display may be provided to rotate in one or more axial directions. The processor may determine position information for a real-world object where the user is to display the marker based on information provided from the eye sensor and rotate the marker display according to the information provided from the eye sensor to enable the marker to be displayed on the real-world object where the user is to display the marker.

The marker display may include a focus variable lens. The processor may determine depth information for a real-world object where the user is to display the marker based on the information provided from the eye sensor and change a focal length of the marker according to the depth information provided from the eye sensor.

The marker generator may match a plurality of AR objects to one marker. The plurality of AR objects may include different pieces of offset information for the generated marker.

The marker generator generates a plurality of markers of continuous frames. The plurality of markers may correspond to continuous images of one AR object or correspond to different AR objects.

According to another embodiment of the present disclosure, an AR device comprises a marker generator generating a marker corresponding to a shared AR object, a marker recognizer recognizing a marker from an image obtained by a camera, and a transceiver transmitting or receiving data to/from a host device, wherein the transceiver transmits identification information for the marker generated by the marker generator and information for an AR object corresponding to the marker to the host device and transmits identification information for the marker recognized by the marker recognizer to the host device and receives AR object corresponding to the marker.

According to still another embodiment of the present disclosure, an AR sharing system comprises a first electronic device including a marker generator generating a marker corresponding to a shared AR object and a first transceiver transferring identification information for the generated marker and AR object information corresponding to the marker to a host and a second electronic device including a marker recognizer recognizing a marker from an image obtained by a camera and a second transceiver transferring identification information for the recognized marker to the host and receiving AR object information corresponding to the identification information for the recognized marker from the host.

The host may be cloud storage. The first electronic device may further include a marker display projecting the generated marker to a real world. The marker recognizer of the second electronic device may recognize the projected marker.

The host may be a smart device. The smart device may display the generated marker on a screen. The marker recognizer of the second electronic device may recognize the marker displayed on the smart device.

Advantageous Effects

According to the present disclosure, the electronic device and AR sharing system with the electronic device may directly display a marker on a real-world object corresponding to an AR object to be shared, thereby allowing the sharee electronic device to view the same AR object by simply sharing the marker identification information and AR object information, but rather than the whole information for the AR object positioned on the map data as in the prior art. This leads to a reduction in the amount of data transmitted and transmission time.

According to the prior art, as information for the shared AR object is associated with the map information, the map data needs to be re-shared whenever updated. However, according to the present disclosure, the electronic device may share the AR object information without the need for separate map data. Thus, even when a change is made to the AR world, e.g., due to the sharer's motion, no update is needed for the shared information, thus reducing data transmissions and shortening the transmission time.

According to an embodiment of the present disclosure, since the AR object information which is to be shared is transferred to the sharee electronic device via a host, e.g., a cloud, data transmission efficiency may be increased, and transmission time may be reduced.

According to an embodiment of the present disclosure, the sharee electronic devices may be connected together by simply connecting to the same host. As such, the entire connection process may be simplified.

According to an embodiment of the present disclosure, a marker corresponding to a shared AR object is generated and is then displayed on the real world. Thus, the AR object may be shared quickly in various circumstances.

According to an embodiment of the present disclosure, projection is adopted to display markers. Thus, generated markers may be displayed quickly.

According to an embodiment of the present disclosure, as the marker display is rotatable, a marker may be displayed in the position which the user is viewing and, even when the user moves, the marker may be fixed in the preset position.

According to an embodiment of the present disclosure, it is possible to secure the optimal visibility depending on the position the marker is displayed by adjusting, e.g., the focal length, color, size, brightness, and sharpness of the marker display.

According to an embodiment of the present disclosure, it is possible to match a plurality of AR objects with a single marker.

According to an embodiment of the present disclosure, it is possible to match continuous images of the same AR object with markers which are varied over time or to match different AR objects with the markers.

DESCRIPTION OF DRAWINGS

FIG. 1 illustrates one embodiment of an AI device.

FIG. 2 is a block diagram illustrating the structure of an eXtended Reality (XR) electronic device according to one embodiment of the present invention.

FIG. 3 is a perspective view of a VR electronic device according to one embodiment of the present invention.

FIG. 4 illustrates a situation in which the VR electronic device of FIG. 3 is used.

FIG. 5 is a perspective view of an AR electronic device according to one embodiment of the present invention.

FIG. 6 is an exploded perspective view of a controller according to one embodiment of the present invention.

FIGS. 7 to 13 illustrate various display methods applicable to a display unit according to one embodiment of the present invention.

FIG. 14 is a perspective view illustrating an electronic device according to an embodiment of the present disclosure;

FIG. 15 is a view illustrating an example in which a first user views an AR image;

FIG. 16 is a view illustrating an example in which the first user projects and sets a marker to a shared AR object;

FIG. 17 is a view illustrating an example in which a second user views a marker;

FIG. 18 is a view illustrating an example in which the second user views a marker-set AR object;

FIG. 19 is a view illustrating an example in which the first user displays and sets a marker to a shared AR object using a mobile device;

FIG. 20 is a view illustrating an example in which the second user views a marker;

FIG. 21 is a view illustrating an example in which the second user views a marker-set AR object;

FIG. 22 is a concept view illustrating an example of projecting a marker to thereby share an AR object according to a first embodiment of the present disclosure;

FIG. 23 is a concept view illustrating an example of displaying a marker using a mobile device according to a second embodiment of the present disclosure;

FIG. 24 is a concept view illustrating an example of displaying a marker using a smart device according to a third embodiment of the present disclosure;

FIG. 25 is a concept view illustrating an example of directly sharing virtual reality information between electronic devices according to a fourth embodiment of the present disclosure;

FIG. 26 is a view illustrating an example of setting multi-object information to a single marker according to an embodiment of the present disclosure;

FIG. 27 is a view illustrating an example of setting a single piece of object information based on multiple markers;

FIG. 28 is a view illustrating an example of setting multi-object information based on multiple markers;

FIG. 29 is a view illustrating an example in which an electronic device projects a marker in a first position;

FIG. 30 is a view illustrating the position of a marker projected when an electronic device moves in the example of FIG. 29;

FIG. 31 is a view illustrating a variation in a marker projected when the electronic device moves out of a range allowed by a marker display in the example of FIG. 30;

FIG. 32 is a view illustrating the principle of a zoom lens; and

FIG. 33 is a block diagram illustrating a configuration of an electronic device according to an embodiment of the present disclosure.

MODE FOR DISCLOSURE

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present invention will be described.

FIG. 2 is a block diagram illustrating the structure of an XR electronic device 20 according to one embodiment of the present invention.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

FIG. 3 is a perspective view of a VR electronic device according to one embodiment of the present invention, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50*a*, 50*b*) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present invention. For example, an input device installed in the electronic device 30 may replace the controller 40, and position information may be determined by itself from various sensors installed in the electronic device 30.

FIG. 5 is a perspective view of an AR electronic device according to one embodiment of the present invention.

As shown in FIG. 5, the electronic device according to one embodiment of the present invention may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

FIG. 6 is an exploded perspective view of a controller according to one embodiment of the present invention.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7 to 13 illustrate various display methods applicable to the display unit 300 according to one embodiment of the present invention.

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display unit used for contact lenses.

As shown in FIG. 7, the display unit 300-1 according to one embodiment of the present invention may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display unit 300-2 according to another embodiment of the present invention may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 9(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 9(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 9(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present invention may include a retina scan method.

FIG. 14 is a perspective view illustrating an electronic device 500 according to an embodiment of the present disclosure.

Referring to FIG. 14, according to an embodiment of the present disclosure, an electronic device 500 includes a frame 510, a display 520 mounted on the front surface of the frame 510 to display augmented reality (AR) images, an external camera 540 mounted on the frame 510 to capture the real world, and a marker display 550 projecting a marker image forwards.

The frame 510 includes a front frame 511 disposed ahead of the user's head and a pair of side frames 512 extending backwards from two opposite sides of the front frame 511 and placed on the user's ears to support the electronic device 500.

The display 520 includes a glass 521 supported by the front frame 511 and corresponding to the user's left and right eyes and an optical device 522 receiving image signals from the processor 530 and displaying the image signals on the glass 521.

The glass 521 may be provided in the type of goggles whose portions corresponding to the left and right eyes are integrally formed or in the type of glasses in which the eyes-corresponding portions are separated from each other. Where a left eye glass and a right eye glass are separately provided in the glass 521, they may be connected via a bridge.

One side of the glass 521 may be supported by the top and bottom of the front frame 511, or the glass 521 may be surrounded and supported by the front frame 511. The optical unit 522 may have one side connected with the processor 530 and another side provided on the glass 521. An image signal transmitted from the processor may be converted into an optical signal by the optical device 522, and the optical signal may be radiated to the user's eye. The user may view the AR image radiated from the optical device 522 positioned ahead of the user's eye while simultaneously viewing the real world through the transparent glass 521. As the user views the AR image overlaid on the real world, she may perceive as if the AR image is part of the real world.

The external camera 540 may capture the real world into an image. The processor 530 may analyze the image received from the external camera 540, thereby recognizing real-world objects. For example, the processor 530 may recognize, e.g., people, vehicles, buildings, roads, TVs, or mobile devices. The processor 530 may set an area for the real-world object. For example, where there are a vehicle parked in front of a building and a street light partially blocking the vehicle, the processor 530 may extract the area of the vehicle except for the building and the street light and set the extracted area as an object area. The processor 530 may retrieve prior data about the vehicle, predict even the vehicle portion hidden by the streetlight, and include the hidden portion in the object area.

The external camera 540 may be provided in various manners to enable the processor 530 to stereoscopically recognize the real world. For example, the external camera 540 may include a depth-of-field camera and a brightness camera, as well as an image camera. The processor 530 may reconfigure the real world into stereoscopic data based on the image information, depth information, and brightness information. A pair of external cameras 540 may be provided at the left and right to produce more precise stereoscopic images.

The processor 530 may create an AR image corresponding to the real-world object recognized via the external camera 540 and transfer the AR image to the display 520. The AR image displayed to the user may be provided to correspond to the position, size, and depth of the real-world object. Thus, the user may view a lifelike augmented reality by merging the real world, which is viewed through the lens, and the AR image corresponding to the real world.

The marker display 550 may be provided to display the marker image on the real world, and the marker display 550 may be, e.g., a projector that projects and displays the marker image on the real world. The projector may be a cathode ray tube (CRT), liquid crystal display (LCD), digital light processing (DLP), or laser projector. The projector may project the marker image transferred from the processor 530, and the user may display a marker on the real-world object where the marker is to be displayed.

The marker display 550 may be a marker display device provided separately from the electronic device 500. The marker display 550 may have a display window and may display the marker transferred from the processor 530 on the display window. The user may bring a separate marker display device to the real-world object where the marker is to be displayed and may display the marker image.

The marker display 550 may be a mobile device (e.g., a smartphone). A processor of the mobile device may interact with the processor 530 of the electronic device. The marker display 550 may display the marker image transferred from the processor of the mobile device on the screen. The user may bring the mobile device to the real-world object where the marker is to be displayed and may display the marker image.

The marker display 550 may display the marker image in a hologram. Hologram means a photographic recording made by holography which is technology that records stereoscopic information based on light interference caused when two laser beams meet and reproduces the stereoscopic information. If displayed in hologram, but rather than in image, the user may recognize the marker in a stereoscopic manner.

The marker display 550 may be used to provide the marker as an identifier when sharing the real-world object. When a first user views AR objects along with the real world on the AR electronic device 500 and desires to share some of the AR objects with other users, the marker may be utilized.

For example, the first user sets a range for the AR object to be shared and generates a marker for identifying the AR object. The first user then displays the generated marker on the real-world object near the AR object. In this case, the projector or mobile device may be used to display the marker as set forth above. For example, where an AR object of a show home is created and placed on a table, a marker corresponding to the show home image may be created and displayed on the table via the marker display 550.

The processor 530 may memorize the identification information for the marker and transfer the identification information to the electronic device 500 directly or via a host. The identification information for the marker may include a relative position of the marker for the AR object. The user may display the marker to overlap the AR object or may display the marker on one side of the AR object to prevent the two images from overlapping each other. Where the AR object is displayed on the real-world object, the user may display the marker under the AR object. When the relative position information for the marker and the AR object is shared, other users may view the AR object in the same position as that in the real world.

The processor 530 may have a marker identifier capable of identifying the marker from the image obtained by the external camera 540. The processor 530 may determine the identified marker image to thereby obtain the identification information for the marker.

According to an embodiment of the present disclosure, the electronic device 500 may further include an eye sensor 561 that detects and tracks the user's pupil. The eye sensor 561 may include a capturing device and a lighting device for tracking the user's pupil. The processor 530 may determine the position of the real-world object where the AR object is displayed, as well as the position of the AR object which the user is viewing based on the information obtained from the eye sensor 561. For example, the processor 530 may determine the direction based on the position of the pupil and determine the distance based on the thickness of the crystalline lens.

The processor 530 may identify the AR data which the user intends to identify based on the information from the sensor 561. The processor 530 may adjust the position of the marker based on the information from the eye sensor 561. For example, the eye sensor 561 may estimate the position to which the user is viewing based on the position information and distance information and may project the marker to the estimated position via the marker display 550 provided as a projector.

According to an embodiment of the present disclosure, the electronic device 500 may further include a sensor 562 capable of tracking the position of the user's head. For example, the sensor 562 may be a 9-axis sensor and may include a gyroscope, an accelerometer, and a magnetometer. The nine axes may be defined as three acceleration axes, two gyro axes, three geomagnetic axes, and one temperature axis.

The marker display 550 may be provided to be able to rotate in one or more axial directions. For example, the marker display 550 may be provided to be able to rotate in a horizontal and vertical direction. The range in which the marker may be displayed may be determined depending on angles at which the marker display 550 is allowed to rotate in the horizontal direction and angles at which the marker display 550 is allowed to rotate in the vertical direction.

According to an embodiment, the marker display 550 may move according to the movement of the user's pupil. In other words, if the user moves the pupil to the right while the marker display 550 projects the marker, the eye sensor 561 may recognize it and transfer it to the processor 530, and the processor 530 may rotate the marker display 550 at the corresponding angle in the direction along which the user moves.

The marker display 550 may adjust the size and focal length of the marker depending on the distance at which the user is viewing. For example, if the user looks far away while the marker display 550 projects the marker, the eye sensor 561 may recognize it and transfer it to the processor 530, and the processor 530 may adjust the focal length of the marker to a different one and, in some cases, resize the marker.

Alternatively, the marker display 550 may fix the position where the marker is projected. If the marker display 550 fails to fix the position of the marker, and the position where the mark is projected is varied as the user moves, then such an occasion may arise where after the first user projects the marker corresponding to the real-world object, the second user may not move before recognizing the marker. However, if the marker is displayed while rotating in the opposite direction to the direction in which the user moves, such issue may be addressed.

For example, if the user moves the head to the right while the marker display 550 projects the marker, the sensor 562 may recognize the user's motion and transfer it to the processor 530, and the processor 530 may rotate the marker display 550 at the corresponding angle in the opposite direction to the direction in which the user moves.

According to an embodiment of the present disclosure, the electronic device 500 may include a transceiver 570. AR object information and marker information may be mutually transferred via the transceiver 570 between the electronic device 500 and the host or external electronic device. The transceiver 570 may take advantage of various data transmission protocols. For example, the transceiver 570 may communicate data via Wi-Fi.

According to an embodiment of the present disclosure, the electronic device 500 may include a manipulator for issuing commands or instructions, a microphone 312 583 for conversations or issuing voice commands, and a speaker 584 for receiving sound information. The manipulator may include a button 581 for transferring physical signals and touch circuitry 582 for transferring electrical signals.

A method for sharing AR information is described below with reference to FIGS. 15 to 21.

FIGS. 15 to 18 illustrate a method for sharing AR information using the marker display 550 which is provided as a projector.

FIG. 15 is a view illustrating an example in which a first user A views an AR image. FIG. 16 is a view illustrating an example in which the first user A projects and sets a marker M to a shared AR object O. FIG. 17 is a view illustrating an example in which a second user B views the marker. FIG. 18 is a view illustrating an example in which the second user B views the marker (M)-set AR object O.

Referring to FIG. 15, the first user A wears a first electronic device 500-1 and views the AR object O, which is a show home, on a table R. In this case, the first user A may intend to share the show home AR object O, which he is viewing, with other users who are participating in the session.

Unlike shown, the AR object O which is to be shared may be an AR video. In other words, a flow of continuous AR images may be shared within a predetermined time.

Referring to FIG. 16, the first user A sets the show home O as the target for sharing, and the processor of the first electronic device 500-1 generates a marker M which is to serve as an identifier for the show home O. In this case, the marker M may be a unique marker M assigned to the show home O or may be a marker M arbitrarily created. The first user A controls the manipulator to operate the marker display 550, and the marker display 550 projects the marker M to the table R which is the real-world object which the user is viewing.

The transceiver of the first electronic device 500-1 transfers show home information and the identification information for the marker M to the host. The marker identification information includes shape information for the marker M, AR object information corresponding to the marker M, and relative position information between the marker M and the AR object O.

Referring to FIG. 17, the second user B who attends the same session as the first user A wears a second electronic device 500-2 and views the marker M displayed on the table R. If the external camera 540 of the second electronic device 500-2 recognizes the marker M, the transceiver 570 transfers the marker identification information to the host. Specifically, the processor of the second electronic device 500-2 may extract only the marker (M) image from the real world image recognized by the external camera 540, identifies the marker image, and transfers it to the host. The host extracts the AR object information corresponding to the marker identification information provided from the second electronic device 500-2 and transfers the extracted AR object information to the transceiver of the second electronic device 500-2.

Referring to FIG. 18, the processor of the second electronic device 500-2 transfers the image signal to the display so that the AR object O received from the host is shown to the second user B. In this case, the show home O may be displayed in the position corresponding to the marker M.

Thus, the first user A and the second user B may view the same AR object O in the same position as the real-world object R.

FIGS. 19 to 21 illustrate a method for sharing AR information using a mobile device D as the marker display.

FIG. 19 is a view illustrating an example in which the first user A displays and sets a marker M on the shared AR object O using the mobile device D. FIG. 20 is a view illustrating an example in which a second user B views the marker. FIG. 21 is a view illustrating an example in which the second user B views the marker (M)-set AR object O.

Referring to FIG. 19, the first user A sets the show home O as the target for sharing, and the processor of the first electronic device 500-1 generates a marker M which is to serve as an identifier for the show home O. In this case, the marker M may be a unique marker M assigned to the show home O or may be a marker M arbitrarily created.

The transceiver of the first electronic device 500-1 transfers the marker identification information to the mobile device D. The first user A positions the marker M on the table R which is the real-world object where the shared AR object O is displayed, with the marker M displayed on the display of the mobile device D.

The transceiver of the first electronic device 500-1 transfers show home information and the identification information for the marker M to the host. The marker identification information includes shape information for the marker M, AR object information corresponding to the marker M, and relative position information between the marker M and the AR object O.

Referring to FIG. 20, the second user B who attends the same session as the first user A wears a second electronic device 500-2 and views the marker M displayed on the table R. If the external camera 540 of the second electronic device 500-2 recognizes the marker M, the transceiver 570 transfers the marker identification information to the host. The host extracts the AR object information corresponding to the marker identification information provided from the second electronic device 500-2 and transfers the extracted AR object information to the transceiver of the second electronic device 500-2.

Referring to FIG. 21, the processor of the second electronic device 500-2 transfers the image signal to the display so that the AR object O received from the host is shown to the second user B. In this case, the show home O may be displayed in the position corresponding to the marker M.

Thus, the first user A and the second user B may view the same AR object O in the same position as the real-world object R.

FIG. 22 is a concept view illustrating an example of projecting a marker M to thereby share an AR object O according to a first embodiment of the present disclosure.

Referring to FIG. 22, the first electronic device 500-1 which intends to share the AR object O and the second electronic device 500-2 with which the AR object O is shared may be connected to the host C via their respective transceivers and transmit and receive AR object information and marker identification information to/from the host C. The AR object O may be stored in the electronic device 500 or may be received by the transceiver of the electronic device 500 from the host C.

The host C may be a shared server, e.g., cloud storage. Cloud storage is technology in which information may be stored in a storage space which is located somewhere in the Internet and, as needed, be retrieved by various terminals. The cloud storage may also be used for sharing data. If the sharer transfers an address for accessing the data to the other party, i.e., sharee, the other party may access the same data via the address.

The shared AR object O includes an AR video as well as an AR image. The first electronic device 500-1 displays the AR object O on the display 520.

The first electronic device 500-1 displays the AR object O in the position corresponding to the real-world object. The first electronic device 500-1 generates a marker M corresponding to the AR object O according to the user's command. In this case, the marker M may be a unique marker M assigned to the AR object O or may be a marker M arbitrarily created.

The first electronic device 500-1 may project the marker M image in the position corresponding to the AR object O via the marker display 550. The marker display 550 may display the marker M on the real-world object corresponding to the AR object O or may display the marker M under the AR object O.

The first electronic device 500-1 may transfer the marker M identification information and AR object O information to the host C via the transceiver. The marker identification information includes shape information for the marker M, AR object information corresponding to the marker M, and relative position information between the marker M and the AR object O.

Where the AR object O is stored in the host C, the transceiver may transfer only the identification information for the AR object O or may otherwise transfer the whole AR object O information.

After the marker M is displayed, the second electronic device 500-2 may recognize the marker M via the external camera 540. The second electronic device 500-2 transfers the marker M identification information to the host C via the transceiver. The transceiver receives the AR object information corresponding to the marker M from the host C. Where the AR object O is stored in the second electronic device 500-2, the transceiver may receive only the AR object O identification information or may otherwise receive the whole AR object O information.

Lastly, the second electronic device 500-2 displays the AR object O in the position corresponding to the marker M. Thus, what is shown to the first electronic device 500-1 may be shown likewise to the second electronic device 500-2.

Meanwhile, the AR object O displayed on the first electronic device 500-1 may be displayed in the position corresponding to the AR object, and the marker M may be projected to the real-world object. The AR object O displayed on the second electronic device 500-2 may be displayed in the position corresponding to the same real-world object based on the marker M identification information.

FIG. 23 is a concept view illustrating an example of displaying a marker M using a mobile device D according to a second embodiment of the present disclosure.

Referring to FIG. 23, the first electronic device 500-1 of the first user A may communicate marker identification information and AR object information with the host C. The mobile device D may obtain information about the shape of the marker M from the host C. The mobile device D may obtain the shape information for the marker M directly from the first electronic device 500-1.

The mobile device D is placed on the real-world object near the AR object O, with the marker M displayed on the display of the mobile device D. In this case, the mobile device D may be a hologram display device.

After the marker M is displayed, the second electronic device 500-2 may recognize the marker M via the external camera 540. The second electronic device 500-2 transfers the marker M identification information to the host C via the transceiver. The transceiver receives the AR object information corresponding to the marker M from the host C. Where the AR object O is stored in the second electronic device 500-2, the transceiver may receive only the AR object O identification information or may otherwise receive the whole AR object O information.

Lastly, the second electronic device 500-2 displays the AR object O in the position corresponding to the marker M. Thus, what is shown to the first electronic device 500-1 may be shown likewise to the second electronic device 500-2.

FIG. 24 is a concept view illustrating an example of displaying a marker M using a smart device S according to a third embodiment of the present disclosure.

Referring to FIG. 24, the first electronic device 500-1 of the first user A may communicate marker identification information and AR object information with the smart device S. The smart device S may mean a device that is able to obtain and transfer AR object information beyond the mobile device D which merely obtains and displays marker M information.

The smart device S is placed on the real-world object near the AR object O, with the marker M displayed on the display of the smart device S.

After the marker M is displayed, the second electronic device 500-2 may recognize the marker M via the external camera 540. The second electronic device 500-2 transfers the marker M identification information to the smart device S via the transceiver. The transceiver receives the AR object information corresponding to the marker M from the smart device S. Where the AR object O is stored in the second electronic device 500-2, the transceiver may receive only the AR object O identification information or may otherwise receive the whole AR object O information.

Lastly, the second electronic device 500-2 displays the AR object O in the position corresponding to the marker M. Thus, what is shown to the first electronic device 500-1 may be shown likewise to the second electronic device 500-2.

FIG. 25 is a concept view illustrating an example of directly sharing virtual reality information between electronic devices 500 according to a fourth embodiment of the present disclosure.

Referring to FIG. 25, the first electronic device 500-1 and the second electronic device 500-2 may communicate marker identification information and AR object information directly via their respective transceivers. The AR object O may be stored in each of the first and second electronic devices 500-1 and 500-2, and the transceiver of the second electronic device 500-2 may receive the AR object O from the first electronic device 500-1.

The first electronic device 500-1 displays the AR object O on the display 520. The first electronic device 500-1 displays the AR object O in the position corresponding to the real-world object. The first electronic device 500-1 generates a marker M corresponding to the AR object O according to the user's command. In this case, the marker M may be a unique marker M assigned to the AR object O or may be a marker M arbitrarily created.

The first electronic device 500-1 may project the marker M image in the position corresponding to the AR object O via the marker display 550. The marker display 550 may display the marker M on the real-world object corresponding to the AR object O or may display the marker M under the AR object O.

After the marker M is displayed, the second electronic device 500-2 may recognize the marker M via the external camera 540. The second electronic device 500-2 transfers the marker M identification information to the first electronic device 500-1 via the transceiver. The transceiver receives the AR object information corresponding to the marker M from the first electronic device 500-1. Where the AR object O is stored in the second electronic device 500-2, the transceiver may receive only the AR object O identification information or may otherwise receive the whole AR object O information.

In other words, the first electronic device 500-1 may transfer the marker M identification information and AR object O information to the second electronic device 500-2 via the transceiver. The marker M identification information includes the shape of the marker M, the AR object O information corresponding to the marker M, and information for the position or direction of the marker M.

Lastly, the second electronic device 500-2 displays the AR object O in the position corresponding to the marker M. Thus, what is shown to the first electronic device 500-1 may be shown likewise to the second electronic device 500-2.

Unlike shown in the drawings, the marker M may be displayed using the mobile device D or smart device S which displays the marker M.

FIG. 26 is a view illustrating an example of setting multi-object information to a single marker M according to an embodiment of the present disclosure.

Although one AR object O corresponds to one marker M in the above example, a plurality of AR objects O1 to O5 may alternatively correspond to one marker M. In this case, the plurality of AR objects O1 to O5 may be arranged not to overlap each other. The positions of the AR objects O1 to O5 may be arranged within the xyz space around the marker M.

The marker M may include information for the plurality of pieces of corresponding AR objects O1 to O5 as identification information. In this case, the identification information may include information for the offset from the center of the marker M in the x, y, and z directions.

Referring to FIG. 26, an AR video (e.g., Mario) O1 may be displayed in the z direction from the marker M. The AR video O1 may be played automatically or in response to the user's command. An AR image (a mushroom) O2 may be displayed in the x direction from the marker M. Besides, a web browser O3, a mirrored mobile phone screen O4, and a short-cut icon O5 may be displayed in different, non-overlapping directions. The web browser O3, the mirrored mobile phone screen O4, or the short-cut icon O5 may be executed in response to the user's command. In particular, a messenger, social media, or phone function may be performed via the short-cut icon O5.

FIG. 27 is a view illustrating an example of setting one piece of object information based on multiple markers M. FIG. 28 is a view illustrating an example of setting multi-object information based on multiple markers M.

The marker M used for identifying the AR object O may be provided as a combination of different markers M1, M2, and M3 which switch over time. For example, the different markers M1, M2, and M3 may be continuously displayed according to frames P1, P2, and P3 in the same point. The different markers M1, M2, and M3 identify different AR images O1, O2, and O3.

Referring to FIG. 27, each marker M may correspond to the AR object O which indicates continuous motions. For example, the AR object O2 corresponding to the marker M2 displayed in the current frame P2 may show the next motion of the AR object O1 corresponding to the marker M1 displayed in the previous frame P1, and the AR object O3 corresponding to the marker M3 displayed in the subsequent frame P3 may be rendered to differ from that for the current frame P2. In other words, the AR objects O1 to O3 may represent continuous motions.

Referring to FIG. 28, each marker M may correspond to different AR objects O. For example, the marker M2 displayed in the current frame P2 may correspond to the AR object O2 representing a singer, the marker M1 displayed in the previous frame P1 may correspond to the AR object O1 representing a violinist, and the marker M3 displayed in the subsequent frame P3 may correspond to the AR object O3 representing a drummer.

Described below is a method for displaying a marker M in a predetermined position in the real world with reference to FIGS. 29 to 31.

FIG. 29 is a view illustrating an example in which an electronic device 500 projects a marker M in a first position.

Referring to FIG. 29, the electronic device 500 may project the marker M in the position corresponding to the AR object O via the marker display 550. In the drawings, the xy coordinates represent the position where the marker M is displayed in the real world.

FIG. 30 is a view illustrating the position of a projected marker M when an electronic device 500 moves in the example of FIG. 29.

Where the user turns her head while the electronic device 500 displays the marker M, if the marker display 550 does not turn, the marker M is moved as the user moves. To prevent such occasion, the marker display 550 may turn in the opposite direction to the user's head turn, thereby keeping the marker M in the displayed position.

For example, the electronic device 500 may detect the user's motion via the sensor. Specifically, the electronic device 500 may be aware of detailed information, such as the direction, distance, angle, and acceleration of the motion, via the sensor. The processor may control the marker display 550 to enable the marker M to remain in the same position despite the user's motion based on the information from the sensor.

FIG. 31 is a view illustrating a variation in a marker M projected when the electronic device 500 moves out of a range allowed by a marker display 550 in the example of FIG. 30.

The maximum rotation angle of the marker display 550 is preset. If the user moves out of the range, the marker display 550 may not display the marker M any longer in the same position.

For example, where the position of the marker M projected with the marker display 550 rotated to the maximum is 1 m away along the x direction from the position set for the AR object O corresponding to the marker M, a direction indication for the original position where the marker M is supposed to be displayed, along with the distance it should be moved, may be displayed to the left of the marker M. FIG. 31 illustrates an example in which the position which is 1 m away to the left of the marker M is the original position where the marker M is supposed to be displayed.

The electronic device 500 may enhance the recognition rate for the marker M. The recognition rate for the marker M may be enhanced based on the color, size, brightness, and sharpness.

The processor 530 may recognize the color of the background or the color of the real-world object around the marker M from the image obtained by the external camera 540 and generate a marker M by performing color inversion or color correction on the recognized color. For example, where a marker M needs to be displayed in a white background, a black marker M may be generated and, when a marker M is required in a black background, a white marker M may be generated.

The processor 530 may adjust the field of view of the marker display 550 depending on the distance at which the marker M is projected, thereby enabling projection of the marker M in the optimal size, brightness, and sharpness. For example, the marker display 550 may adjust the field of view using a zoom lens or focus variable lens.

FIGS. 32A, 32B, and 32C are views illustrating the principle of a zoom lens.

Referring to FIG. 32A, a zoom lens may include a convex lens L1, a concave lens L2, and a convex lens L3 arranged along the direction in which light travels and in parallel with each other. The third lens, i.e., the convex lens L3, may be fixed in position, and the second lens, i.e., the concave lens L2, may move along the optical axis between the two convex lenses L1 and L3. As the concave lens L2 is repositioned between the convex lens L1 and the convex lens L2, the focal length is varied continuously in proportion to the position of the concave lens L2.

Referring to FIG. 32B, as the concave lens L2 is positioned close to the convex lens L1 and relatively far away from the convex lens L3, the focal length of the optical system may be shortened, allowing the image to be projected at a wide angle.

Referring to FIG. 32C, as the concave lens L2 is positioned relatively far away from the convex lens L1 and relatively close to the convex lens L3, the focal length of the optical system may be lengthened, allowing the image to be projected far away.

FIG. 33 is a block diagram illustrating a configuration of an electronic device 500 according to an embodiment of the present disclosure.

According to an embodiment of the present disclosure, an electronic device 500 may include an AR object generator 531 for generating an AR object, a marker generator 532 for generating a marker corresponding to the AR object, a marker identifier 540 for identifying the generated marker, a marker display 550 for displaying the generated marker, and a transceiver 570 for communicating AR object information and marker identification information with a host or another electronic device. The AR object generator 531 and the marker generator 532 may be provided in the processor 530.

The marker identifier 540 may be an external camera 540 in a broad meaning and, in a narrow meaning, a means for identifying the marker image from an image obtained by the external camera 540.

The marker display 550 may be a projector provided in the electronic device 500 or may be a mobile device provided separately from the electronic device 500.

The transceiver 570 may communicate data via Wi-Fi.

The marker generator 532 generates marker identification information, and the transceiver 570 shares the marker identification information with a host or another electronic device. The marker identification information may include the shape of the marker, the position of the marker projected to the real world, and offset information for the positional deviation between the real-world object and the marker.

Some of the above-described embodiments are interpreted as excluding or distinguishing from other embodiments. The components or functions in some embodiments described above may be used together or combined with the components or functions in other embodiments.

For example, component A described in connection with a particular embodiment and the drawings may be combined or merged with component B described in connection with another embodiment and the drawings. In other words, a combination of components, although not explicitly described, may be rendered possible unless stated as impossible.

Thus, the above description should be interpreted not as limiting in all aspects but as exemplary. The scope of the present disclosure should be determined by reasonable interpretations of the appended claims and all equivalents of the present disclosure belong to the scope of the present disclosure.

The invention claimed is:

1. An augmented reality (AR) device, comprising:
a frame supported by a user's head;
a processor providing an AR image;
a display connected with the frame and overlaying and displaying the AR image received from the processor on a real world;
a marker generator generating a marker corresponding to an AR object;
a marker display displaying the marker generated by the marker generator; and
an eye sensor detecting the user's pupil,
wherein the processor determines position and/or depth information for a real-world object where the user is to display the marker based on information provided from the eye sensor, and transfers an instruction to the marker display to enable the marker to be displayed on the real-world object where the user is to display the marker.

2. The AR device of claim 1, wherein the marker display projects a marker image to the real world.

3. The AR device of claim 2, wherein the frame includes a front frame and a pair of side frames connected with two opposite sides of the front frame and extending backwards from the two opposite sides of the front frame,
wherein the display includes a left eye display disposed on one side of the front frame and a right eye display disposed on an opposite side of the front frame, and
wherein the marker display is provided between the left eye display and the right eye display.

4. The AR device of claim 1, wherein the marker display is provided as a separate device from the frame, and
wherein the marker display is wiredly or wirelessly connected with the marker generator to display the generated marker.

5. The AR device of claim 1, further comprising a transceiver transferring identification information for the generated marker and AR object information corresponding to the generated marker to a host.

6. The AR device of claim 1, further comprising:
a camera capturing the real world; and
a marker identifier identifying a marker in an image captured by the camera,
wherein the processor provides AR object information corresponding to the identified marker to the display.

7. The AR device of claim 6, further comprising a transceiver transferring identification information for the generated marker and AR object information corresponding to the generated marker to a host,
wherein the transceiver transfers identification information for the identified marker to the host and obtains AR object information corresponding to the identification information for the identified marker, and
wherein the processor provides AR object information corresponding to the identified marker to the display.

8. The AR device of claim 2, wherein the marker display is provided to rotate in one or more axial directions.

9. The AR device of claim 8, further comprising a motion sensor detecting a motion of the display,
wherein the processor rotates the marker display according to information provided from the motion sensor to allow the marker displayed by the marker display to be projected in the same position as the position in the real world.

10. The AR device of claim 8, further comprising a depth sensor detecting a depth of a real world object to which the marker is projected, wherein the processor changes a focal length of the marker according to information provided from the depth sensor.

11. The AR device of claim 8, further comprising a color sensor detecting a color of a real world object to which the marker is projected, wherein the marker generator changes a color of the marker according to information provided from the color sensor.

12. The AR device of claim 1, wherein the marker display is provided to rotate in one or more axial directions, and wherein the processor determines the position information for the real-world object where the user is to display the marker based on the information provided from the eye sensor and rotates the marker display according to the information provided from the eye sensor to enable the marker to be displayed on the real-world object where the user is to display the marker.

13. The AR device of claim 1, wherein the marker display includes a focus variable lens, and wherein the processor determines the depth information for the real-world object where the user is to display the marker based on the information provided from the eye sensor and changes a focal length of the marker according to the depth information provided from the eye sensor.

14. The AR device of claim 1, wherein the marker generator matches a plurality of AR objects to one marker, and wherein the plurality of AR objects include different pieces of offset information for the generated marker.

15. The AR device of claim 1, wherein the marker generator generates a plurality of markers of continuous frames, and wherein the plurality of markers correspond to continuous images of one AR object or correspond to different AR objects.

16. An augmented reality (ARS sharing system, comprising:

a first electronic device including a marker generator generating a marker corresponding to a shared AR object and a first transceiver transferring identification information for the generated marker and AR object information corresponding to the marker to a host; and a second electronic device including a marker recognizer recognizing a marker from an image obtained by a camera and a second transceiver transferring identification information for the recognized marker to the host and receiving AR object information corresponding to the identification information for the recognized marker from the host.

17. The AR sharing system of claim 16, wherein the host is a cloud storage, wherein the first electronic device further includes a marker display projecting the generated marker to a real world, and wherein the marker recognizer of the second electronic device recognizes the projected marker.

18. The AR sharing system of claim 16, wherein the host is a smart device, wherein the smart device displays the generated marker on a screen, and wherein the marker recognizer of the second electronic device recognizes the marker displayed on the smart device.

19. An augmented reality (AR) device, comprising:
a frame supported by a user's head;
a processor providing an AR image;
a display connected with the frame and overlaying and displaying the AR image received from the processor on a real world;
a marker generator generating a marker corresponding to an AR object; and
a marker display displaying the marker generated by the marker generator,
wherein the marker generator matches a plurality of AR objects to one marker, and
wherein the plurality of AR objects include different pieces of offset information for the generated marker.

* * * * *